United States Patent
Cavaliere et al.

(10) Patent No.: US 11,764,872 B2
(45) Date of Patent: Sep. 19, 2023

(54) OPTICAL DISPERSION COMPENSATOR

(71) Applicant: Telefonaktiebolaget LM Ericsson (publ), Stockholm (SE)

(72) Inventors: Fabio Cavaliere, Pisa (IT); Luca Giorgi, Pisa (IT); Luca Poti, Pisa (IT); Gabriele De Angelis, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/277,823

(22) PCT Filed: Sep. 21, 2018

(86) PCT No.: PCT/EP2018/075661
§ 371 (c)(1),
(2) Date: Mar. 19, 2021

(87) PCT Pub. No.: WO2020/057752
PCT Pub. Date: Mar. 26, 2020

(65) Prior Publication Data
US 2021/0288719 A1    Sep. 16, 2021

(51) Int. Cl.
*H04B 10/2513*    (2013.01)
*G02B 6/293*    (2006.01)

(52) U.S. Cl.
CPC ... *H04B 10/25133* (2013.01); *G02B 6/29394* (2013.01); *G02B 6/29343* (2013.01); *G02B 6/29395* (2013.01)

(58) Field of Classification Search
CPC .......... H04B 10/25133; H04B 10/2513; G02B 6/29394; G02B 6/29343; G02B 6/29395
See application file for complete search history.

(56) References Cited

U.S. PATENT DOCUMENTS

| 7,724,994 B1 * | 5/2010 | Pepper | H01Q 3/2676 |
| | | | 385/27 |
| 8,755,693 B2 * | 6/2014 | Mazzochette | H04B 10/2575 |
| | | | 398/115 |

(Continued)

FOREIGN PATENT DOCUMENTS

| FR | 2879863 A1 * | 6/2006 | ....... H04B 10/25133 |
| WO | 97 37446 | 10/1997 | |

(Continued)

OTHER PUBLICATIONS

PCT Notification of Transmittal of the International Search Report and the Written Opinion of the International Searching Authority, or the Declaration issued for International application No. PCT/EP2018/075661—Jun. 11, 2019.

(Continued)

*Primary Examiner* — Leslie C Pascal
(74) *Attorney, Agent, or Firm* — BAKER BOTTS L.L.P.

(57) ABSTRACT

An Optical Dispersion Compensator (ODC) is disclosed, the ODC being suitable for managing chromatic dispersion of an optical signal for transmission over an optical fiber. The ODC comprises a first ODC unit (202) arranged on a first optical bus (206), a second ODC unit (204) arranged on a second optical bus (208), parallel to the first optical bus (206), and a switching element (210) interconnecting the first and second optical buses (206, 208) between the first and second ODC units (202, 204). The first and second ODC units (202, 204) are operable to provide a delay to the optical signal that varies with frequency. The switching element (210) is configured, in a first state, to switch an optical signal received on one of the first or second optical buses (206, 208) to the other of the first or second optical buses (208, 206) and, in a second state, to maintain an optical signal received on one of the first or second optical buses (206, 208) on the optical bus on which it was received (206, 208).

(Continued)

Reflective elements (710) may be included in the ODC, providing bidirectional propagation through one of more ODC units.

6 Claims, 17 Drawing Sheets

(56) References Cited

U.S. PATENT DOCUMENTS

| | | |
|---|---|---|
| 2003/0128920 A1 | 7/2003 | Way |
| 2004/0208619 A1* | 10/2004 | Li .................... H04B 10/25133 398/159 |
| 2008/0151377 A1* | 6/2008 | Sekine ............... H04B 10/2525 359/615 |
| 2009/0310977 A1* | 12/2009 | Barbarossa ............ H04B 10/58 398/184 |
| 2017/0336567 A1* | 11/2017 | Wang ................ H04B 10/2525 |

FOREIGN PATENT DOCUMENTS

| | | |
|---|---|---|
| WO | 03 041281 A2 | 5/2003 |
| WO | 2019 015779 A1 | 1/2019 |

OTHER PUBLICATIONS

100Gb/s PolMux-NRZ Transmission at 1550nm over 30km Single Mode Fiber Enabled by a Silicon Photonics Optical Dispersion Compensator by Vito Sorianello et al.—2018.

\* cited by examiner

| Compensation (km) | 0 | 5 | 10 | 15 | 20 |
|---|---|---|---|---|---|
| Number of active switching element(s) | 2 | 0 | 2 | 2 | 1 |
| Number of active micro-rings | 0 | 2 | 3 | 5 | 5 |
| Number of heaters required | 2 | 2 | 5 | 7 | 6 |
| Active switching element(s) | 1306, 1312 | - | 1306, 1348 | 1312, 1348 | 1306 |
| Used ODC unit(s) | - | 1314 | 1344a | 1314, 1344a | 1344b |

Fig. 14

OPTICAL DISPERSION COMPENSATOR

PRIORITY

This nonprovisional application is a U.S. National Stage Filing under 35 U.S.C. § 371 of International Patent Application Serial No. PCT/EP2018/075661 filed Sep. 21, 2018 and entitled "Optical Dispersion Compensator" which is hereby incorporated by reference in its entirety.

TECHNICAL FIELD

The present disclosure relates to an Optical Dispersion Compensator (ODC) for managing chromatic dispersion of an optical signal for transmission over an optical fiber. The present disclosure also relates to a transmitter and a receiver comprising ODCs and to method of transmitting and receiving an optical signal.

BACKGROUND 5G mobile networks require support for high bit rate transmission in the underlying optical transport network, including metro access and aggregation segments. The distances involved in such segments are relatively short compared to long haul optical communications. For example, access and aggregation segments may extend over distances up to approximately 20 km. Mobile network access is highly cost sensitive, and consequently, direct detection optical interfaces are preferred over the more expensive coherent optical interfaces which may be used for long haul communications.

Direct detection interfaces typically transmit in the wavelength region around 1310 nm, where chromatic dispersion of an optical fiber is low and does not need to be compensated for. However, only Dense Wavelength Division Multiplexing (DWDM) systems, which operate in the 1550 nm wavelength region, can offer the high capacity and other capabilities required by 5G. Chromatic dispersion in the 1550 nm wavelength region severely affects the performance of direct detection transmission systems. It is therefore necessary to compensate for chromatic dispersion of a direct detection transmission system when operating in the DWDM 1550 nm wavelength region.

Various options exist for the compensation of chromatic dispersion in direct detection transmission systems. Some examples include in line optical dispersion compensation devices, such as Dispersion Compensating Fiber (DCF), Fiber Bragg gratings (FBG), or liquid crystals (LC); Electronic equalization, implemented in a digital signal processor at the receiver; Electronic pre-distortion, implemented in a digital signal processor at the transmitter; Optical dispersion compensating devices integrated at the receiver; and the use of some dispersion tolerant modulation formats. Each of these existing options for chromatic dispersion compensation carries associated disadvantages when contemplated for use in the access segment of communication network. Such disadvantages include prohibitive cost, difficulty of implementation, loss and bandwidth limitations. A full discussion of the options for chromatic dispersion compensation in direct detection transmission systems, together with their associated constraints, is provided in patent application PCT/EP2017/068473 (Reference 1).

Reference 1 proposes a photonic integrated device which may be placed at a transmitter for achieving chromatic dispersion compensation in a high capacity DWDM direct detection transmission system. As reported in Vito Sorianello et al., "100 Gb/s PolMux-NRZ Transmission at 1550 nm over 30 km Single Mode Fiber Enabled by a Silicon Photonics Optical Dispersion Compensator", W2A.31, OFC2018 (Reference 2), such a photonic integrated device may be based on Silicon or Silicon Nitride micro-rings. Reference 2 illustrates a chromatic compensation device which operates on a similar working principle to that disclosed in Reference 1 but which may be integrated in a receiver. As illustrated in FIG. 1, which is adapted from Reference 2, a received optical signal 10 input to a receiver 2 is first directed through a polarisation controller 4 and then the different polarisation components of the signal, Pol X and Pol Y are directed along dedicated optical buses 6, 8. Reference 2 proposes a modular structure, according to which consecutive Optical Dispersion Compensator (ODC) units 12 are connected by optical switches 14 along each of the optical buses. The switches 14 can either route a signal through an ODC unit or by-pass it, according to the activation of the switches.

The modular structure of FIG. 1 enables the receiver 2 to be configured to compensate for chromatic dispersion arising from transmission over different lengths of optical fiber. For example, assuming that each ODC block 12 compensates for dispersion arising from 10 km of fiber: for very short links, from 0 to 5 km, all the ODC units 12 will be by-passed by the switches 14; from 5 to 15 km, the switches will route the signal through the first ODC unit 12 and bypass the remaining two ODCs, and so on. The same concept is applies in the transmitter of Reference 1, according to which no polarisation controller is required, as the input polarisation of the optical signal is known, and so only a single optical bus with multiple ODC units is present.

Integrated photonic components offer many advantages, however power consumption remains an important cost factor in their implementation. In the modular structure illustrated in FIG. 1, heaters are required both to commute the switches 14 and to tune the resonance peaks of the micro ring resonators in each ODC block 12. It is desirable to minimise the power consumption of all components, and to ensure that the overall power consumption of the optical dispersion compensation is significantly less than that specified for the pluggable module hosting the dispersion compensation device, which in most examples will be of the order of a few watts.

SUMMARY

According to a first aspect of the present disclosure, there is provided an Optical Dispersion Compensator (ODC) for managing chromatic dispersion of an optical signal for transmission over an optical fiber. The ODC comprises a first ODC unit arranged on a first optical bus and a second ODC unit arranged on a second optical bus, wherein the second optical bus is in parallel to the first optical bus. The ODC further comprises a switching element interconnecting the first and second optical buses, wherein the switching element is located between the first and second ODC units in a direction of propagation of the ODC. The first and second ODC units are operable to provide a delay to the optical signal that varies with frequency. The switching element is configured, in a first state, to switch an optical signal received on one of the first or second optical buses to the other of the first or second optical buses and, in a second state, to maintain an optical signal received on one of the first or second optical buses on the optical bus on which it was received.

According to examples of the present disclosure, the ODC may further comprise a plurality of ODC units alternately arranged on the first and second optical buses, such that in a direction of propagation of the ODC, an ODC unit on one of the first or second optical buses is followed by an ODC unit on the other of the first and second optical buses, and a plurality of switching elements interconnecting the first and second optical buses between the ODC units.

According to examples of the present disclosure, at least one optical switching unit may interconnect the first and second optical buses immediately before or immediately after each ODC unit.

According to examples of the present disclosure, the ODC may further comprise an input switching element interconnecting an input of the ODC with the first and second optical buses. The input switching element may be configured, in a first state, to transfer an optical signal received from the input of the ODC to one of the first or second optical buses and, in a second state, to transfer an optical signal received from the input of the ODC to the other of the first or second optical buses.

According to examples of the present disclosure, the first ODC unit may be arranged adjacent to the input switching element, and the input switching element may be configured, in the first state, to transfer an optical signal received from the input of the ODC to the second optical bus and, in the second state, to transfer an optical signal received from the input of the ODC to the first optical bus.

According to examples of the present disclosure, the ODC may further comprise a reflective element on at least one of the first or second optical buses, the reflective element operable to reflect an optical signal.

According to examples of the present disclosure, the ODC may further comprise an output switching element connecting the first and second optical buses to an output of the ODC.

According to examples of the present disclosure, the first state of the switching elements may comprise an inactive state and wherein the second state of the switching elements may comprise an active state.

According to examples of the present disclosure, an active state of a switching element may be a state in which the switching element consumes electrical power, and an inactive state may be a state in which the switching element does not consume electrical power. According to examples of the present disclosure, the switching elements may be 2:2 Mach Zehnder switches, in which, in the first or inactive state, an upper input is connected to a lower output and a lower input is connected to an upper output, and, in the second or active state, an upper input is connected to an upper output and a lower input is connected to a lower output.

According to examples of the present disclosure, each of the first and second ODC units may comprise a plurality of delay elements, each delay element configured to apply a delay to a sub-band of the optical signal.

According to examples of the present disclosure, the delay elements may comprise micro ring resonators.

According to examples of the present disclosure, each of the first and second ODC units may comprise the same number of delay elements.

According to examples of the present disclosure, each of the first and second ODC units may comprise a different number of delay elements.

According to examples of the present disclosure, the ODC may be implemented in an integrated circuit, and one or more of: an optical light source, a modulator and an amplifier may be implemented in the same integrated circuit.

According to another aspect of the present disclosure, there is provided a transmitter comprising an ODC according to any one of the preceding aspects or examples of the present disclosure.

According to another aspect of the present disclosure, there is provided a receiver comprising an ODC according to any one of the preceding aspects or examples of the present disclosure.

According to examples of the present disclosure, the receiver may further comprise a polarisation controller operable to recover a polarisation state of the received optical signal. The polarisation controller may comprise a polarising beam splitter which may divide the received optical signal into two orthogonal polarisations. The receiver may comprise an ODC according to any one of the preceding aspects or examples of the present disclosure for each of the polarisations.

According to another aspect of the present disclosure, there is provided an Optical Dispersion Compensator (ODC) for managing chromatic dispersion of an optical signal for transmission over an optical fiber. The ODC comprises a first optical waveguide, a second optical waveguide parallel to the first optical waveguide and a first bidirectional switching element interconnecting an input and output of the ODC with the first optical waveguide and the second optical waveguide. The ODC further comprises a first reflective element operable to reflect an optical signal, a second bidirectional switching element interconnecting the first optical waveguide and the second optical waveguide with the first reflective element, and a first ODC unit arranged on the first or second optical waveguide between the first and second switching elements. The ODC unit is operable to provide a delay to the optical signal that varies with frequency. According to some examples of the present disclosure, the reflective element may comprise a mirror.

According to examples of the present disclosure, the first switching element may be configured, in a first state, to connect the input and output of the ODC to one of the first or second optical waveguides and, in a second state, to connect the input and output of the ODC to the other of the first or second optical waveguides. According to such examples, the second switching element may be configured, in a first state, to connect one of the first or second optical waveguides to the first reflective element and, in a second state, to connect the other of the first or second optical waveguides to the first reflective element.

According to examples of the present disclosure, the first ODC unit may comprise a plurality of delay elements, each delay element configured to apply a delay to a sub-band of the optical signal.

According to examples of the present disclosure, the delay elements may comprise micro ring resonators.

According to examples of the present disclosure, the first ODC unit may be arranged on the second optical waveguide and the first switching element may be configured, in a first state, to connect the input and output of the ODC to the second optical waveguide and, in a second state, to connect the input and output of the ODC to the first optical waveguide. According to such examples, the second switching element may be configured, in a first state, to connect the first optical waveguide to the first reflective element and, in a second state, to connect the second optical waveguide to the first reflective element.

According to examples of the present disclosure, the ODC may further comprise a first extension module connected to an output of the second switching element such that the second switching element interconnects the first and second optical waveguides with the first reflective element and with the first extension module. The first extension module may comprise a first extension optical waveguide, a first extension ODC unit arranged on the first extension optical waveguide, a first extension reflective element operable to reflect an optical signal, and a first extension bidirectional switching element that connects the first extension optical waveguide with the first extension reflective element.

According to examples of the present disclosure, the first extension bidirectional switching element may be configured, in a first state, to connect the first extension optical waveguide to a first extension module output and, in a second state, to connect the first extension optical waveguide to the first extension reflective element.

According to examples of the present disclosure, the ODC may comprise a plurality of first extension modules connected in series, such that each succeeding first extension module is connected to a first extension module output of a preceding first extension module.

According to examples of the present disclosure, the ODC may further comprise a second extension module connected to the first extension module output of the first extension module. The second extension module may comprise a second extension optical waveguide, a second extension ODC unit arranged on the second extension optical waveguide, and a second extension reflective element operable to reflect an optical signal and connected to the second extension optical waveguide.

According to examples of the present disclosure, the ODC may further comprise a second extension module connected to an output of the second switching element such that the second switching element interconnects the first and second optical waveguides with the first reflective element and with the second extension module. The second extension module may comprise a second extension optical waveguide, a second extension ODC unit arranged on the second extension optical waveguide, and a second extension reflective element operable to reflect an optical signal and connected to the second extension optical waveguide.

According to examples of the present disclosure, the first ODC unit may be arranged on the second optical waveguide and the first switching element may be configured, in a first state, to connect the input and output of the ODC to the second optical waveguide and, in a second state, to connect the input and output of the ODC to the first optical waveguide. According to such examples, the second switching element may be configured, in a first state, to connect the second optical waveguide to the first reflective element and, in a second state, to connect the first optical waveguide to the first reflective element.

According to examples of the present disclosure, the ODC may further comprise a third extension module connected to an output of the second switching element such that the second switching element interconnects the first and second optical waveguides with the first reflective element and with an input of the third extension module. The third extension module may comprise a third extension first optical waveguide, a third extension first ODC unit arranged on the third extension first optical waveguide and a third extension first reflective element operable to reflect an optical signal and connected to the third extension first optical waveguide. The third extension module may further comprise a third extension second optical waveguide, a third extension second ODC unit arranged on the third extension second optical waveguide and a third extension second reflective element operable to reflect an optical signal and connected to the third extension second optical waveguide. The third extension module may further comprise a third extension bidirectional switching element interconnecting the input of the third extension module with the third extension first optical waveguide and the third extension second optical waveguide.

According to examples of the present disclosure, the third extension bidirectional switching element may be configured, in a first state, to connect the input of the third extension module with the third extension second optical waveguide and, in a second state, to connect the input of the third extension module with the third extension first optical waveguide.

According to examples of the present disclosure, each of the third extension first and second ODC units may comprise a plurality of delay elements, each delay element configured to apply a delay to a sub-band of the optical signal.

According to examples of the present disclosure, the delay elements may comprise micro ring resonators.

According to examples of the present disclosure, each of the third extension first and second ODC units may comprise a different number of delay elements.

According to examples of the present disclosure, each of the third extension first and second ODC units may comprise a different number of delay elements to the first ODC unit.

According to examples of the present disclosure, the first state of the bidirectional switching elements may comprise an inactive state and the second state of the switching elements may comprise an active state.

According to examples of the present disclosure, an active state of a bidirectional switching element may be a state in which the switching element consumes electrical power, and an inactive state may be a state in which the switching element does not consume electrical power. According to examples of the present disclosure, the bidirectional switching elements may be 2:2 Mach Zehnder switches, in which, in the first or inactive state, an upper input is connected to a lower output and a lower input is connected to an upper output, and, in the second or active state, an upper input is connected to an upper output and a lower input is connected to a lower output.

According to examples of the present disclosure, the ODC may be implemented in an integrated circuit, and one or more of: an optical light source, a modulator and an amplifier may be implemented in the same integrated circuit.

According to another aspect of the present disclosure, there is provided a transmitter comprising an ODC according to any one of the preceding aspects or examples of the present disclosure.

According to another aspect of the present disclosure, there is provided a receiver comprising an ODC according to any one of the preceding aspects or examples of the present disclosure.

According to another aspect of the present disclosure, there is provided a method for transmitting an optical signal from a transmitter comprising an ODC according to any one of the preceding aspects or examples of the present disclosure. The method comprises selectively activating the switching element such that the optical signal is either transmitted through the second ODC unit or bypasses the second ODC unit.

According to another aspect of the present disclosure, there is provided a method for transmitting an optical signal from a transmitter comprising an ODC according to any one of the preceding aspects or examples of the present disclosure. The method comprises electively activating at least one of the first or second bidirectional switching elements such that the optical signal is either transmitted through or bypasses the first ODC unit.

According to another aspect of the present disclosure, there is provided a method for receiving an optical signal at a receiver comprising an ODC according to any one of the preceding aspects or examples of the present disclosure. The method comprises selectively activating the switching element such that the optical signal is either transmitted through the second ODC unit or bypasses the second ODC unit.

According to another aspect of the present disclosure, there is provided a method for receiving an optical signal at a receiver comprising an ODC according to any one of the preceding aspects or examples of the present disclosure. The method comprises selectively activating at least one of the first or second bidirectional switching elements such that the optical signal is either transmitted through or bypasses the first ODC unit.

BRIEF DESCRIPTION OF THE DRAWINGS

FIG. 14 is a table illustrating active elements in the ODC of FIG. 12;

DETAILED DESCRIPTION

Aspects of the present disclosure provide an Optical Dispersion Compensator (ODC) that may be incorporated into a transmitter or a receiver for performing chromatic dispersion compensation on an optical signal. The ODC comprises one or more ODC units which provide a delay to the optical signal that varies with frequency. This imposed delay compensates for chromatic dispersion which may be experienced by the optical signal during transmission over a transmission medium such as an optical fiber. If the ODC is incorporated into a transmitter, then the delay imposed by the ODC units may compensate for an expected chromatic dispersion that will be experienced by the signal during transmission. If the ODC is incorporated into a receiver, then the imposed delay may compensate for chromatic dispersion that has taken place during transmission. The effect of the frequency dependent delay imposed by the one or more ODC units of the ODC may be to ensure that a total time delay of the signal following transmission is substantially independent of frequency. The one or more ODC units are configured within the ODC together with one or more switching elements such that the ODC may compensate for a chromatic dispersion associated with different transmission lengths in an energy efficient manner, as is explained below with reference to specific examples of the present disclosure.

Each ODC unit in an ODC according to examples of the present disclosure may comprise one or more delay elements such as micro-ring resonators. The micro-ring resonators may be constructed in a semiconductor material such as silicon nitride. The characteristics of the micro-ring resonators, including radius and coupling coefficient to a waveguide on which the ODC unit is arranged, may be designed and thermally tuned to match the fiber length over which the optical signal is expected to be transmitted, or has been transmitted. The use of Silicon Nitride according to examples of the present disclosure may allow the realization of relatively large micro-ring resonators at an acceptable loss. For a more complete discussion of the operation of micro-ring resonators, and the frequency response of ODC units comprising micro-ring resonators, reference is made to the discussion in PCT/EP2017/068473 (Reference 1).

Figure 2:
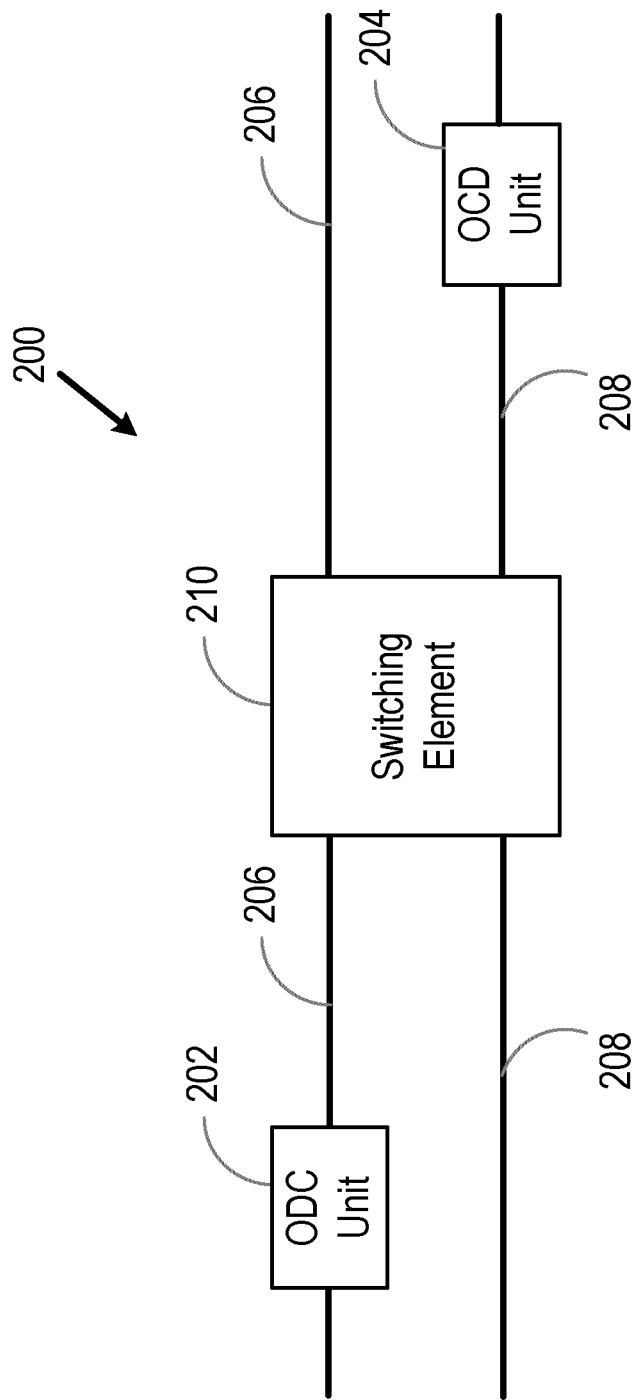
FIG. 2 is a schematic illustration of an Optical Dispersion Compensator (ODC)

FIG. 2 is a schematic illustration of an ODC 200 according to a first aspect of the present disclosure. The ODC 200 is for managing chromatic dispersion of an optical signal for transmission over an optical fiber. The ODC 200 may be incorporated into a transmitter or a receiver and may be employed in a Dense Wavelength Division Multiplexing (DWDM) system. Referring to FIG. 2, the ODC 200 comprises a first ODC unit 202 arranged on a first optical bus 206 and a second ODC unit 204 arranged on a second optical bus 208, the second optical bus being parallel to the first optical bus 206. The first and second ODC units are operable to provide a delay to the optical signal that varies with frequency. In some examples the first and second ODC units 202, 204 may each comprise a plurality of delay elements, each delay element configured to apply a delay to a sub-band of the optical signal. The delay elements may for example comprise micro ring resonators.

The ODC 200 further comprises a switching element 210 interconnecting the first and second optical buses 206, 208 and located between the first and second ODC units 202, 204 in a direction of propagation of the ODC. Thus, if a direction of propagation of the ODC 200 is from left to right in FIG. 2, from input to output, the switching element 210 is located after the first ODC unit 202 and before the second ODC unit 204. The switching element 210 is thus on an optical path between the two ODC units, the optical path encompassing the first optical bus and the second optical bus. In some aspects, the direction of propagation refers to a direction or path of an optical signal through the ODC. The switching element is configured, in a first state, to switch an optical signal received on one of the first or second optical buses to the other of the first or second optical buses and, in a second state, to maintain an optical signal received on one of the first or second optical buses on the optical bus on which it was received. The first state may for example be an inactive state of the switching element, in which the switching element does not consume electrical power, and the second state may for example be an active state in which the switching element consumes electrical power. The switching element may for example comprise a 2:2 Mach Zehnder switch.

Figure 1:
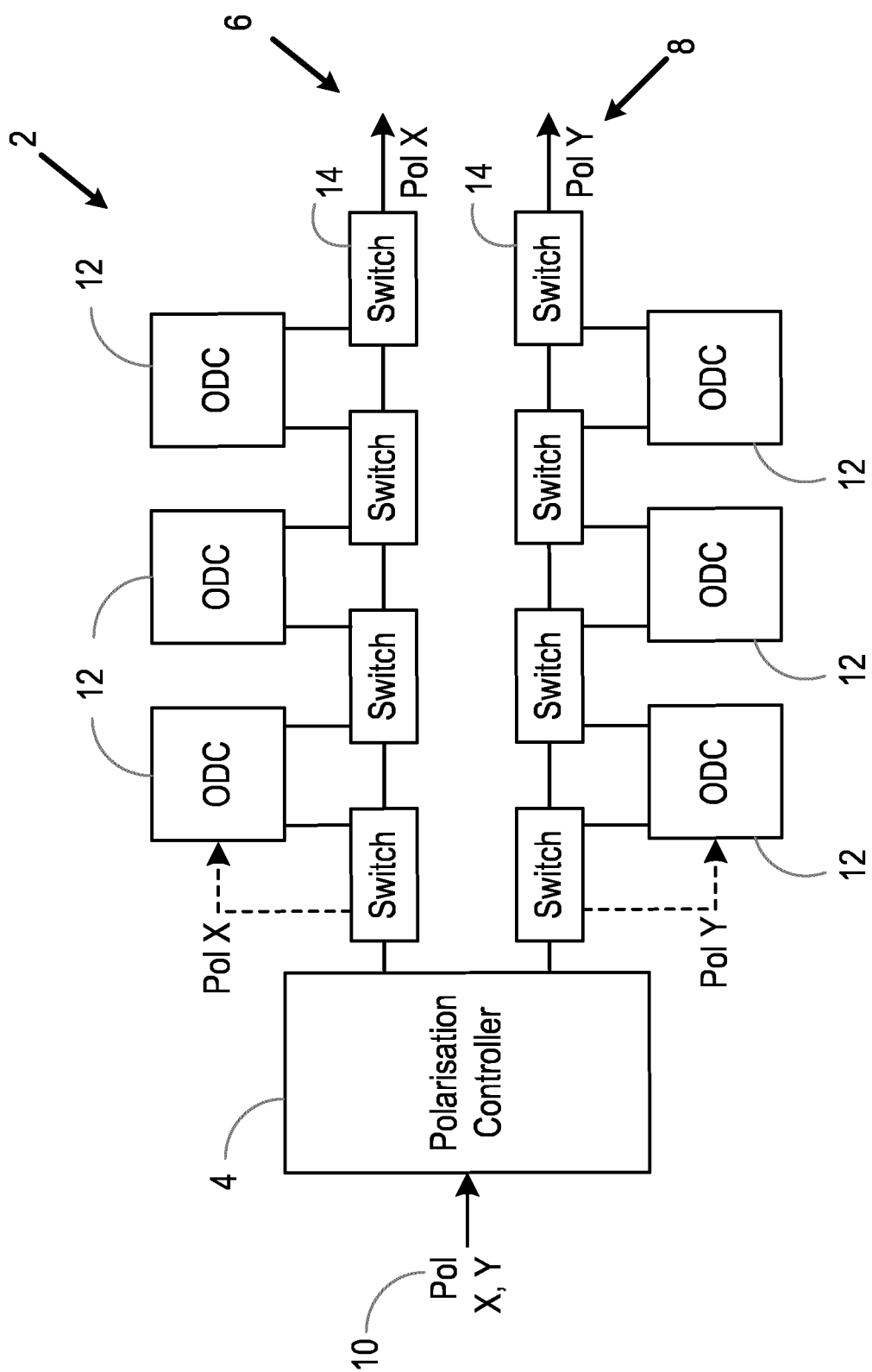
FIG. 1 is a schematic representation of a receiver comprising a chromatic dispersion compensation device.

The ODC 200 offers the advantage that only a single switching element 210 is required for the two ODC units 202, 204. If each ODC unit 202, 204 provides a delay that compensates for chromatic dispersion over a certain transmission distance X km, then the ODC may be operated so as to compensate for three different transmission ranges: 0-X km, X-2X km, and 2X+ km. In the first and third transmission ranges, the switching element 210 may be configured to be in the inactive state. In the first transmission range, an input signal on the second optical bus 208 will bypass the first ODC unit 202, the optical signal will then be switched to the first optical bus 206 by the inactive state switching element 210, and will also bypass the second ODC unit 204. In the third transmission range, an optical signal input on the first optical bus 206 will pass through the first ODC unit 202, be switched to the second optical bus 208 by the inactive state switching element 210 and will then pass through the second ODC unit 204. It will be appreciated that in the first and third transmission ranges, with the switching element 210 in the inactive state, no electrical power is consumed by the switching element. In the second transmission range, only the one switching element 210 is required to be in the active state. This offers considerable advantages compared to the arrangement of FIG. 1, in which multiple switching elements are required to be in an active state.

Figure 3:
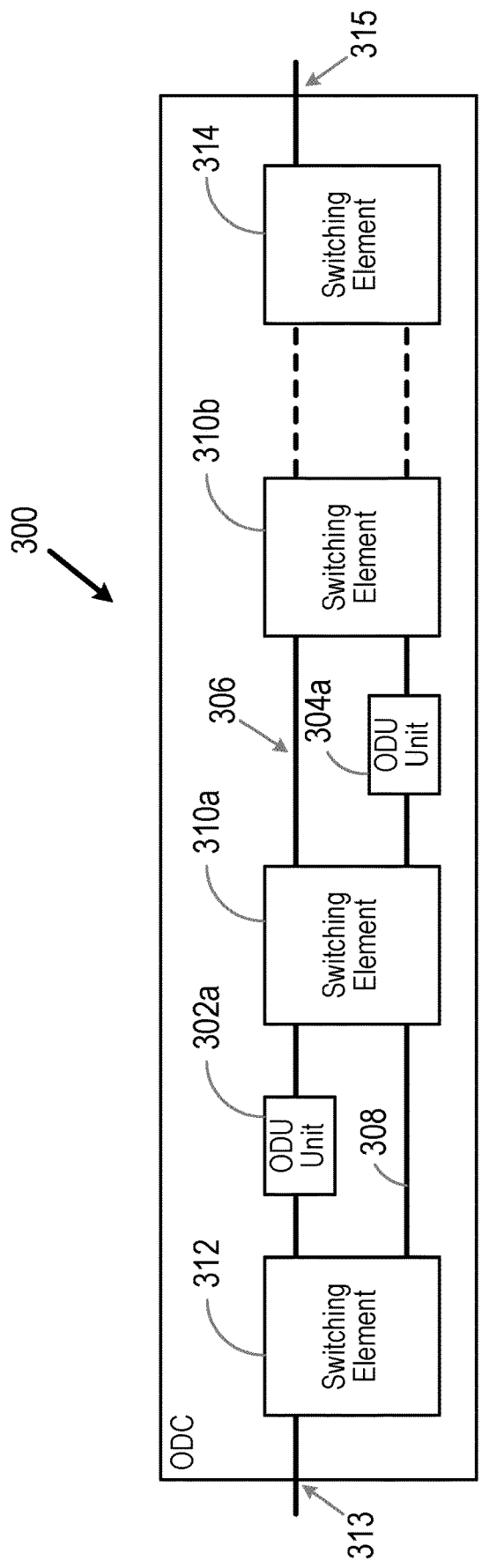
FIG. 3 is a schematic illustration of another example of ODC.

FIG. 3 is a schematic illustration of an ODC 300 according to another example of the present disclosure. The ODC 300 is also for managing chromatic dispersion of an optical signal for transmission over an optical fiber. The ODC 300 may be incorporated into a transmitter or a receiver and may be employed in a DWDM system. Referring to FIG. 3, the ODC 300 comprise a first optical bus 306 and a second optical bus 308, the second optical bus 308 being parallel to the first optical bus 306. The ODC 300 further comprises a first ODC unit 302a arranged on the first optical bus 306 and a second ODC unit 304a arranged on the second optical bus 308. The ODC 300 further comprises a switching element 310a interconnecting the first and second optical buses 306, 308 between the first and second ODC units 302a, 304a. The ODC 300 may comprise a plurality of first and second ODC units alternately arranged on the first and second optical buses 306, 308, such that in a direction of propagation of the ODC 300 (i.e. from left to right in the Figure), an ODC unit on one of the first or second optical buses is followed by an ODC unit on the other of the first and second optical buses. The ODC 300 may further comprise a plurality of switching elements 310b interconnecting the first and second optical buses between the ODC units.

The ODC 300 further comprises an input switching element 312 interconnecting an input 313 of the ODC with the first and second optical buses 306, 308. The input switching element 312 is configured, in a first state, to transfer an optical signal received from the input 313 of the ODC to one of the first or second optical buses and, in a second state, to transfer an optical signal received from the input of the ODC to the other of the first or second optical buses. In the illustrated example, the input switching element is configured, in the first state, to transfer an optical signal received from the input of the ODC to the second optical bus 308 and, in the second state, to transfer an optical signal received from the input of the ODC to the first optical bus 306. The ODC 300 further comprises an output switching element 314 connecting the first and second optical buses 306, 308 to an output 315 of the ODC.

As discussed above with respect to FIG. 2, the first state of the switching elements may be an inactive state, in which the switching elements do not consume electrical power, and the second state may be an active state, in which the switching elements consume electrical power. The switching elements may for example comprise 2:2 Mach Zehnder switches, which may be realised in Silicon Photonics. The switching elements may comprise upper and lower input and output ports. In an inactive state of the switching element, the upper input port may be connected to the lower output port, and the lower input port may be connected to the upper output port. In the active state of the switching elements, the upper input port may be connected to the upper output port, and the lower input port may be connected to the lower output port.

Figure 4:
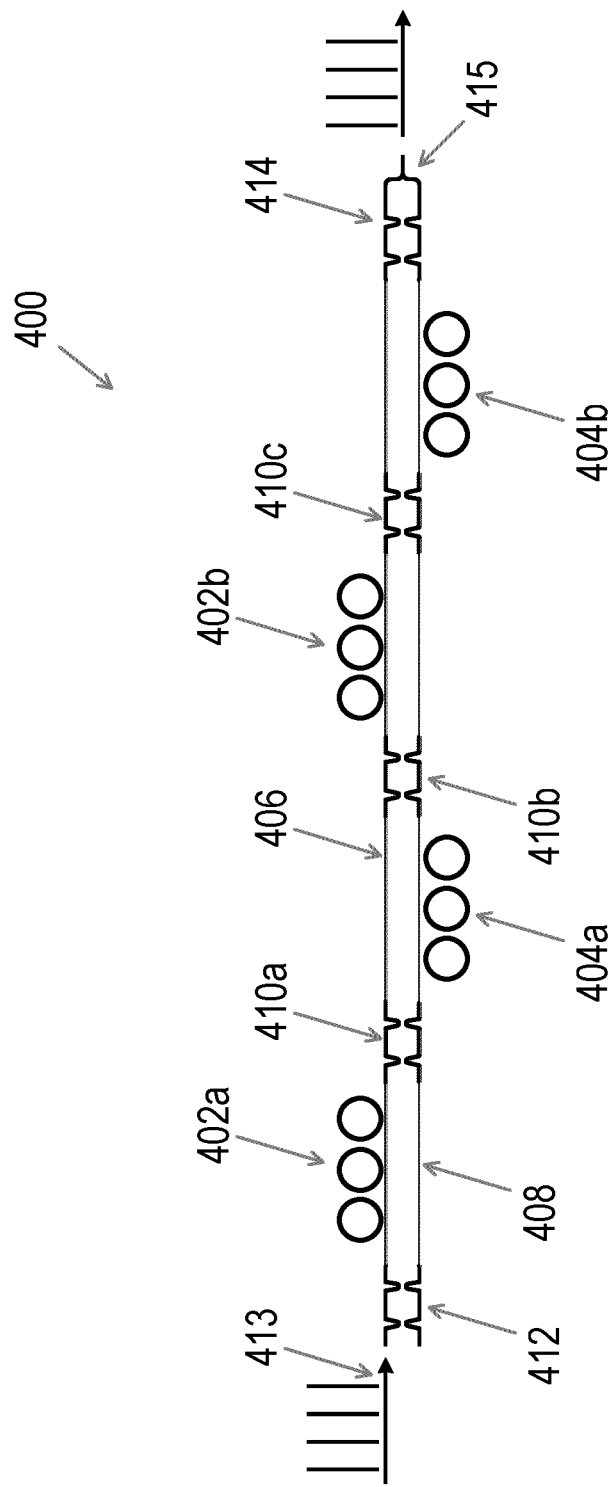
FIG. 4 illustrates an example implementation of an ODC.

FIG. 4 illustrates an example implementation of an ODC according to the schematic illustration of FIG. 3. The example ODC 400 of FIG. 4 comprises two first ODC units 402a, 402b and two second ODC units 404a, 404b. The ODC units are alternately arranged on first and second optical buses 406, 408. An input switching element 412 connects an input 413 of the ODC 400 with the first and second optical buses 406, 408 and an output switching element 415 connects the first and second optical buses 406, 408 with an output 415 of the ODC. A switching element 410a, 410b, 410c interconnects the first and second optical buses 406, 408 adjacent to each ODC unit, such that a switching unit interconnects the first and second optical busses immediately before or immediately after each ODC unit. In the example ODC 400 illustrated in FIG. 4, each ODC unit comprises three micro ring resonators and the switching elements 410a, 410b, 410c, 412 and 414 comprise 2:2 Mach Zehnder switches, with the port configuration in active and inactive states discussed above with reference to FIG. 3.

The first and/or second buses comprise one or more bypass sections. A bypass section does not provide chromatic dispersion compensation. A bypass section is arranged to bypass an ODC unit. The selection of a bypass section for the optical signal is under control of the switching elements 410a, 410b, 410c, as an alternative to selection of a path including an ODC unit. A bypass section on a first or a second bus may be considered to be in parallel to an ODC unit on the other of the first or second bus. Thus, the bypass section(s) provide for connection of the input 413 to the output 415 with a variable number of ODC units included in the active optical path, as controlled by the switching elements. In some examples, a switching element may be in parallel with another switching element providing a different amount of dispersion compensation, instead of being in parallel with a bypass section.

The ODC units being alternately arranged on first and second optical buses 406, 408 may refer to ODC unit 402a being alternately arranged with ODC unit 404a. As such, the ODC units 402a, 404a are on different ones of the first and second buses (i.e. first and second bus respectively). In this example, the ODC units 402a, 404a are each in parallel with a bypass section, although one or both could alternatively be in parallel with a different ODC unit. Along an optical path direction from input to output, the alternatingly arranged ODC units are selectable sequentially for the optical path. In other words, the ODC unit 402a is selected (or bypassed) first, and then the ODC unit 404a is selected (or bypassed).

A switching element is located between the ODC units 402a, 404a in the optical path direction. Selecting, or activating, both the ODC units 402a, 404a results in the optical signal alternating between the first and second buses. The optical signal is configured to change between the first and second buses, or stay on the first bus or second bus, based on the configuration of the switching elements.

The ODC 400 may compensate for chromatic dispersion over a range of different transmission lengths, depending upon how many of the ODC units 402a, 402b, 404a, 404b are activated. It will be appreciated that according to the configuration of the different switching elements, an optical signal may be directed through none, some or all of the ODC units. The alternating arrangement of the ODC units on the parallel optical buses, and the configuration of the different switching elements, ensures that regardless of the transmission length to be compensated, only one switching element is required to be in an active state. The active switching elements and used ODC units are illustrated in table 500 in FIG. 5, for an assumed ODC unit configuration that enables each ODC unit to compensate for chromatic dispersion over a transmission distance of 10 km at 25 Gbit/s.

Figure 5:
FIG. 5 is a table illustrating active elements in the ODC of FIG. 4.

Referring to FIGS. 4 and 5, for a transmission distance of 0-5 km, no dispersion compensation is required, and all ODC units may therefore be bypassed. With all switching elements in the inactive state (such that an input signal is switched between upper and lower input and output ports), an optical signal arriving at the input 413 of the ODC 400 is switched between the first and second optical buses 406, 408 such that all ODC units are bypassed and the signal is delivered to the output 415 of the ODC without any additional imposed delay from the ODC units. In order to compensate for a transmission distance between 5 and 15 km, a single ODC unit should be used. By placing only switching element 410c in the active state, with all other switching elements in the inactive state, all ODC units except for the last ODC unit 404b may be bypassed. In order to compensate for a transmission distance of 15 to 25 km, two ODC units should be used. By placing only switching element 410b in the active state, with all other switching elements in the inactive state, all ODC units except for the last two ODC units 402b and 404b may be bypassed. It will be appreciated that for compensation distances of 25 to 35 and 35 to 45 km, only switching elements 410a and 412 respectively need be in the active state, to direct the optical signal through three and four ODC units respectively.

An ODC having the configuration of FIGS. 2, 3 and/or 4 thus minimises the number of active switching elements required to compensate for chromatic dispersion during transmission of an optical signal over varying transmission distances. Minimising the number of active switching elements minimises the electrical power requirements of the ODC, thus offering energy efficiency compared to prior known ODC configurations.

It will be appreciated that the precise number and nature of the delay elements in the ODC units, and the total number of ODC units, and hence the number of switching elements, may be adjusted according to the needs of a particular deployment. The number of delay elements required in each ODC unit will depend upon the optical signal bandwidth. This may be dictated by the signal bit rate, which will determine the optical signal bandwidth for a given modulation format. The number of ODC units to be included in the ODC will depend upon the total transmission distance to be compensated. On-Off Keying is the simplest modulation format to implement. Next generation 5G transport networks will likely use 50 Gbit/s transmissions over distances of up to 20 km. These parameters were therefore selected as a design reference for testing of different ODC configurations discussed herein. To include possible overhead from forward error correction, a bit rate of 56 Gbit/s was considered, leading to an optical bandwidth for a device incorporating the ODC of about 80 GHz.

Figure 6:
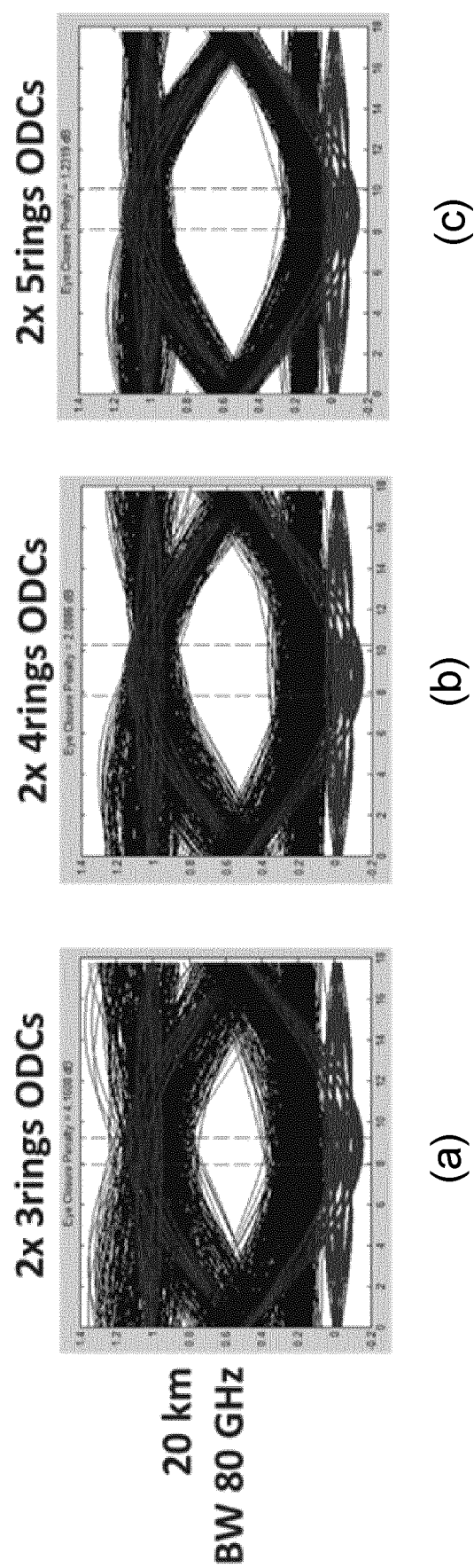
FIG. 6 illustrates eye diagrams for an optical signal emitted from a transmitter incorporating an ODC as illustrated in FIG. 2.

FIG. 6 illustrates eye diagrams for an optical signal emitted from a transmitter incorporating an ODC as illustrated in FIG. 2. Each eye diagram illustrates an optical signal having a bandwidth of 80 GHz after transmission over 20 km. FIG. 6a illustrates the signal after 20 km compensated distance from a transmitter incorporating an ODC with two ODC units of 3 micro-rings each. FIG. 6b illustrates the same signal after 20 km compensated distance from a transmitter incorporating an ODC with two ODC units of 4 micro-rings each. FIG. 6c illustrates the same signal after 20 km compensated distance from a transmitter incorporating an ODC with two ODC units of 5 micro-rings each. In can be seen from FIG. 6 that with 2 ODC units of 5 rings each, a relatively open eye diagram is obtained, indicating successful compensation for chromatic dispersion experienced by the signal during transmission. In order to obtain the open eye diagram of FIG. 6c, 10 micro-rings, each having a dedicated heater, are required. The compensation granularity of such a structure is 10 km, which at 56 GBit/s is too coarse for operational use in a transport network, and requires the use of a chirped transmitter.

A reduction in the number of micro-rings required, and an improvement in compensation granularity, can be achieved by alternative ODC structures, as illustrated and discussed in further detail below.

In some aspects, the ODC may have a structure and function as described in any example, with the first and second buses considered differently. For example, first and second buses may be considered as the optical paths connected by the switching elements being in their inactive states. In FIG. 4, such buses would appear to alternate between 'top' and 'bottom' position. An optical signal will follow the first bus through switching elements in the inactive state. The optical signal will be switched onto the second bus by a switching element in the active state, and then follow the second bus through further switching elements in the inactive state. Thus, in the example of FIG. 4, the first bus would contain all the ODC units, and the second bus would contain the bypass sections providing no chromatic dispersion compensation. With all the switching elements in the inactive state, the optical signal will follow an optical path along only the first bus. Configuration of one or more switching elements into an active state (i.e. power consuming state) would switch the optical path onto the second bus. Further switching elements may switch the optical path back to the first bus or provide for the optical signal to continue along the second bus.

The bypass sections of the second bus provide for an alternative optical path which avoids an ODC unit of the first section. For example, the bypass sections may comprise sections providing no dispersion compensation, or the bypass sections may comprise one or more ODC units in parallel with ODC unit(s) of the first bus. In some examples, the first bus may comprise one or more bypass sections, and the second bus comprises one or more ODC units in parallel with the bypass sections.

Following this definition of the first and second buses as the optical paths when the switching elements are in the inactive states, an ODC may be considered as for managing chromatic dispersion of an optical signal for transmission over an optical fiber; the ODC comprising a first optical bus comprising a first ODC unit and a second ODC unit, and a second optical bus providing a bypass to the first ODC unit and the second ODC unit. The ODC further comprises a switching element interconnecting the first and second optical buses, wherein the switching element is located between the first and second ODC unit. The first ODC unit and second ODC units are operable to provide a chromatic optical dispersion to the optical signal. The switching element is configured, in a first state, to switch an optical signal received on one of the first or second optical buses to the other of the first or second optical buses and, in a second state, to maintain an optical signal received on one of the first or second optical buses on the optical bus on which it was received.

In some aspects, each of the switching elements has an active state and an inactive state. In some aspects, a first state of the switching element is an active state or higher power state, and the second state is an inactive state or lower (e.g. zero) power state. Alternatively, one or more of the switching elements may be in a first state of the switching element which is an inactive state or lower (e.g. zero) power state, and the second state is an active state or higher power state. Any example may have all switching elements having the same configuration of whether the first state (i.e. switching between the first and second buses) corresponds to an active state and inactive state or the switching elements of ODC comprise both configurations of whether the first state corresponds to an active state and inactive state. The second state, corresponding to maintaining the optical signal on the same optical bus, may be considered in the same manner.

Figure 7:
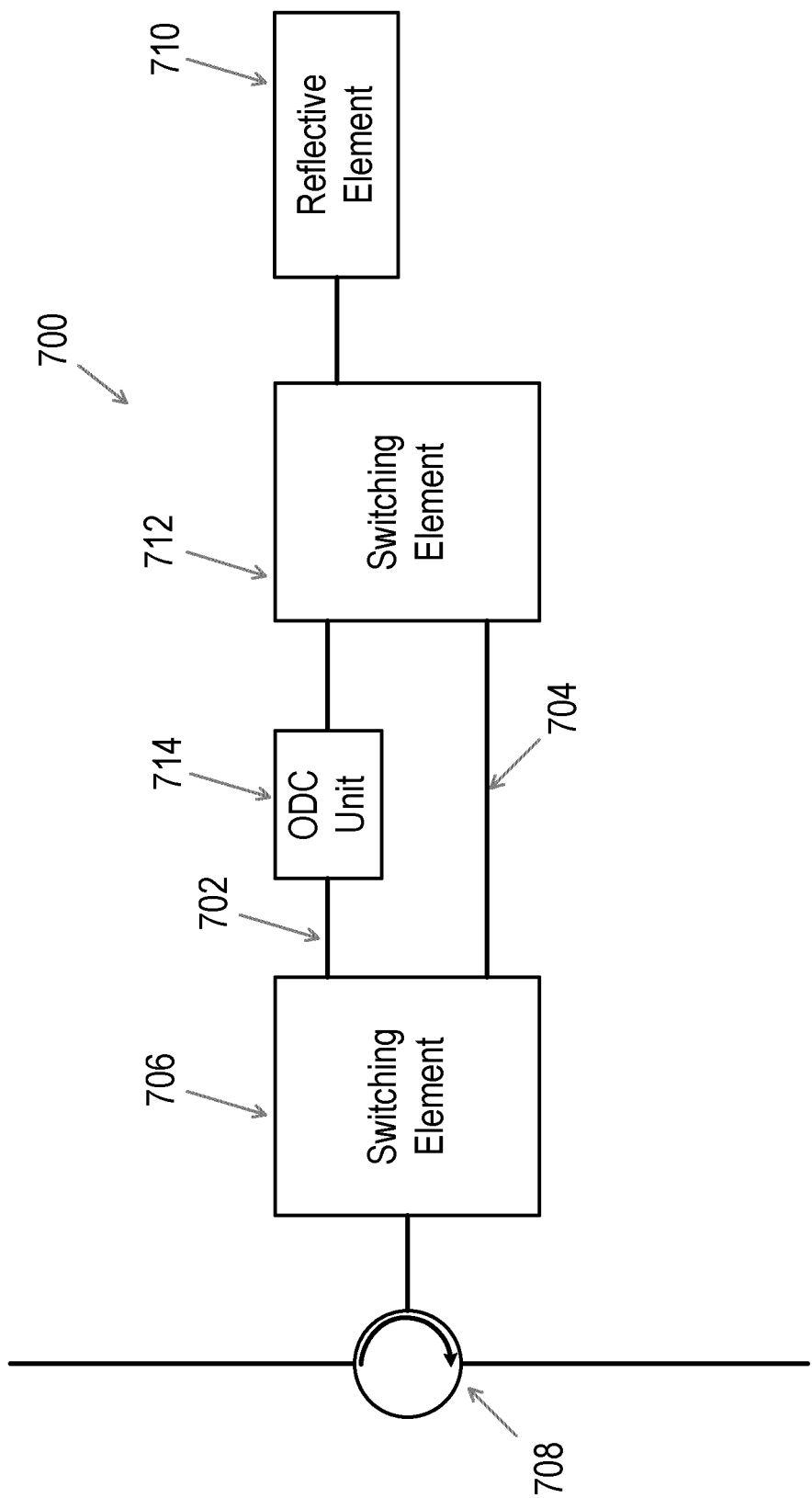
FIG. 7 is a schematic illustration of another example of ODC.

FIG. 7 is a schematic illustration of an ODC 700 according to another aspect of the present disclosure. The ODC 700 is for managing chromatic dispersion of an optical signal for transmission over an optical fiber. The ODC 700 may be incorporated into a transmitter or a receiver and may be employed in a DWDM system. Referring to FIG. 7, the ODC 700 comprises a first optical waveguide 702, a second optical waveguide 704 parallel to the first optical waveguide 702 and a first bidirectional switching element 706 interconnecting an input and output 708 of the ODC 700 with the first optical waveguide 702 and the second optical waveguide 704. The ODC 700 further comprises a first reflective element 710, such as a mirror, operable to reflect an optical signal, a second bidirectional switching element 712 interconnecting the first optical waveguide 702 and the second optical waveguide 704 with the first reflective element 710, and a first ODC unit 714 arranged on the first or second optical waveguide between the first and second switching elements 706, 712. The ODC unit 714 is operable to provide a delay to the optical signal that varies with frequency. The ODC unit may comprise a plurality of delay elements such as micro-ring resonators, each delay element configured to apply a delay to a sub-band of the optical signal.

The ODC 700 introduces the possibility of bidirectional propagation, as opposed to the unidirectional propagation of the ODCs 200, 300, 400 described above. The reflective element 710 enables the optical signal to travel back and forth through the ODC unit 714, so achieving double the compensation for the same number of delay elements in a unidirectional structure. Considered another way, the number of delay elements required for a given compensation distance is halved, with consequent energy savings with the reduced number of heaters required to tune the delay elements.

The first bidirectional switching element 706 may be configured, in a first state, to connect the input and output 708 of the ODC to one of the first or second optical waveguides 702, 704 and, in a second state, to connect the input and output 708 of the ODC to the other of the first or second optical waveguides 704, 702. According to such examples, the second bidirectional switching element 712 may be configured, in a first state, to connect one of the first or second optical waveguides 702, 704 to the first reflective element 710 and, in a second state, to connect the other of the first or second optical waveguides 704, 702 to the first reflective element 710.

In the example illustrated in FIG. 7, the first ODC unit 714 is arranged on the second optical waveguide 704 and the first bidirectional switching element 706 is configured, in the first state, to connect the input and output 708 of the ODC to the second optical waveguide 704 and, in the second state, to connect the input and output 708 of the ODC to the first optical waveguide 702. In the illustrated example, the first reflective element 710 is connected to an upper output of the second bidirectional switching element 712, with the first optical waveguide 702 connected to an upper input of the second bidirectional switching element 712 and the second optical waveguide 704 connected to a lower input of the second bidirectional switching element 712. The second bidirectional switching element 712 is configured, in the first state, to connect the second optical waveguide 704 to the first reflective element 710 and, in the second state, to connect the first optical waveguide 702 to the first reflective element 710. The first state may be an inactive state of the bidirectional switching elements, in which the switching elements do not consume electrical power, and the second state may be an active state in which the switching elements consume electrical power. The bidirectional switching elements may for example comprise 2:2 Mach Zehnder switches having a connectivity between upper and lower input and output ports in active and inactive states as described above with reference to FIG. 3.

An optical signal input to the ODC 700 and connected to an upper input port of the first switching element may be directed, with both switching elements in an inactive state, to bypass the first ODC unit 714 via the second optical waveguide 704 and first reflective element 710. With the switching elements 706, 712 in an active state, such an optical signal may be directed twice through the first ODC unit 714, via the first optical waveguide 702 and first reflective element 710.

Figure 8:
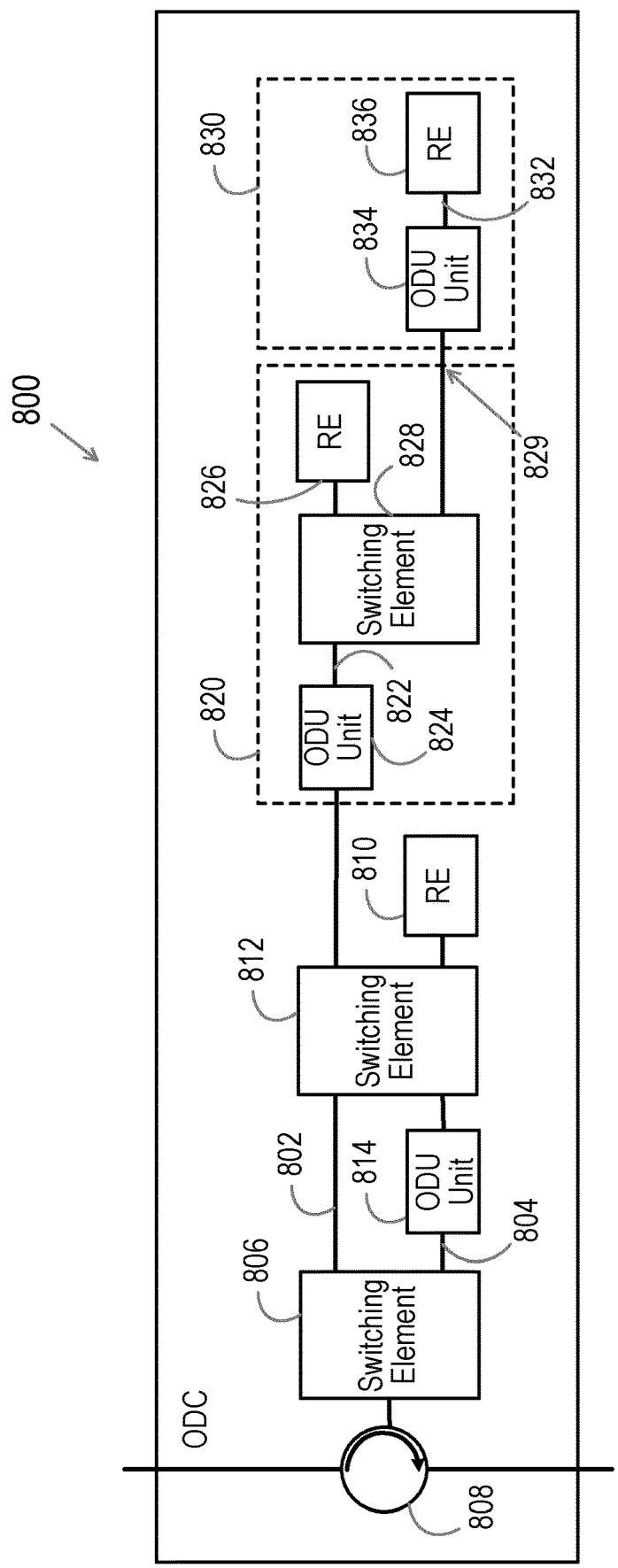
FIG. 8 is a schematic illustration of another example of ODC.

FIG. 8 is a schematic illustration of an ODC 800 according to another example of the present disclosure. The ODC 800 is also for managing chromatic dispersion of an optical signal for transmission over an optical fiber. The ODC 800 may be incorporated into a transmitter or a receiver and may be employed in a DWDM system. Referring to FIG. 8, the ODC 800 comprises a first optical waveguide 802, a second optical waveguide 804 parallel to the first optical waveguide 802 and a first bidirectional switching element 806 interconnecting an input and output 808 of the ODC 800 with the first optical waveguide 802 and the second optical waveguide 804. The ODC 800 further comprises a first reflective element such as a mirror 810 operable to reflect an optical signal, a second bidirectional switching element 812 interconnecting the first optical waveguide 802 and the second optical waveguide 804 with the first reflective element 810, and a first ODC unit 814. In contrast to the configuration of the ODC 700, the first ODC unit 814 of the ODC 800 is arranged on the second optical waveguide 804 between the first and second switching elements 806, 812. Also in contrast to the configuration of the ODC 700, the first reflective element 810 of the ODC 800 is connected to a lower output of the second bidirectional switching element 812, with the first optical waveguide 802 connected to an upper input of the second bidirectional switching element 812 and the second optical waveguide 804 connected to a lower input of the second bidirectional switching element 812.

In the ODC 800, the first bidirectional switching element 806 is configured, in a first state, to connect the input and output 808 of the ODC to the second optical waveguide 804 and, in a second state, to connect the input and output 808 of the ODC to the first optical waveguide 802. The second bidirectional switching element 812 is configured, in a first state, to connect the first optical waveguide 802 to the first reflective element 810 and, in the second state, to connect the second optical waveguide 804 to the first reflective element 810. The first state may be an inactive state of the bidirectional switching elements, in which the switching elements do not consume electrical power, and the second state may be an active state in which the switching elements consume electrical power. The bidirectional switching elements may for example comprise 2:2 Mach Zehnder switches having a connectivity between upper and lower input and output ports in active and inactive states as described above with reference to FIG. 3.

The ODC 800 further comprises a first extension module 820 connected to an output of the second switching element 812 such that the second bidirectional switching element 812 interconnects the first and second optical waveguides 802, 804 with the first reflective element 810 and with the first extension module 820. In the illustrated example, the first extension module 820 is connected to an upper output port of the second bidirectional switching element 812. The first extension module 820 comprises a first extension optical waveguide 822, a first extension ODC unit 824 arranged on the first extension optical waveguide 822, a first extension reflective element such as a mirror 826 operable to reflect an optical signal, and a first extension bidirectional switching element 828 that connects the first extension optical waveguide 822 with the first extension reflective element 826. In the illustrated example, the first extension reflective element is connected to an upper output port of the first extension bidirectional switching element 828 and the first extension optical waveguide 822 is connected to an upper input port of the first extension bidirectional switching element 828. The first extension bidirectional switching element 828 is configured, in a first state, to connect the first extension optical waveguide 822 to a first extension module output 829 and, in a second state, to connect the first extension optical waveguide 822 to the first extension reflective element 826.

According to some examples of the present disclosure, the ODC 800 may comprise a plurality of first extension modules 820 connected in series, such that each succeeding first extension module is connected to a first extension module output of a preceding first extension module. This is illustrated in the ODC 900 described below.

The ODC 800 further comprises a second extension module 830 connected to the first extension module output 829 of the first extension module 820. The second extension module 830 comprises a second extension optical waveguide 832, a second extension ODC unit 834 arranged on the second extension optical waveguide 832, and a second extension reflective element such as a mirror 836 operable to reflect an optical signal and connected to the second extension optical waveguide 832.

The ODC 800 provides dispersion compensation for varying transmission distances. With appropriate activation or non-activation of the bidirectional switching elements 806, 812, and 828, an optical signal may bypass, or may be directed twice through none, one, two or all three of the ODC units 814, 824 and 834. The bidirectional propagation of the ODC 800 halves the number of delay elements, and hence the number of heaters required for the ODC units, compared to a unidirectional transmission structure.

In some examples (not shown), the first extension module 820 may be omitted and an output of the second bidirectional switching element 812 is connected to the second extension module 830 such that the second bidirectional switching element 812 interconnects the first and second optical waveguides 802, 804 with the first reflective element 810 and with the second extension module 830. In other examples, multiple second extension modules 820 may be included between the second bidirectional switching element and the second extension module, as illustrated in the example implementation of FIG. 9.

Figure 9:
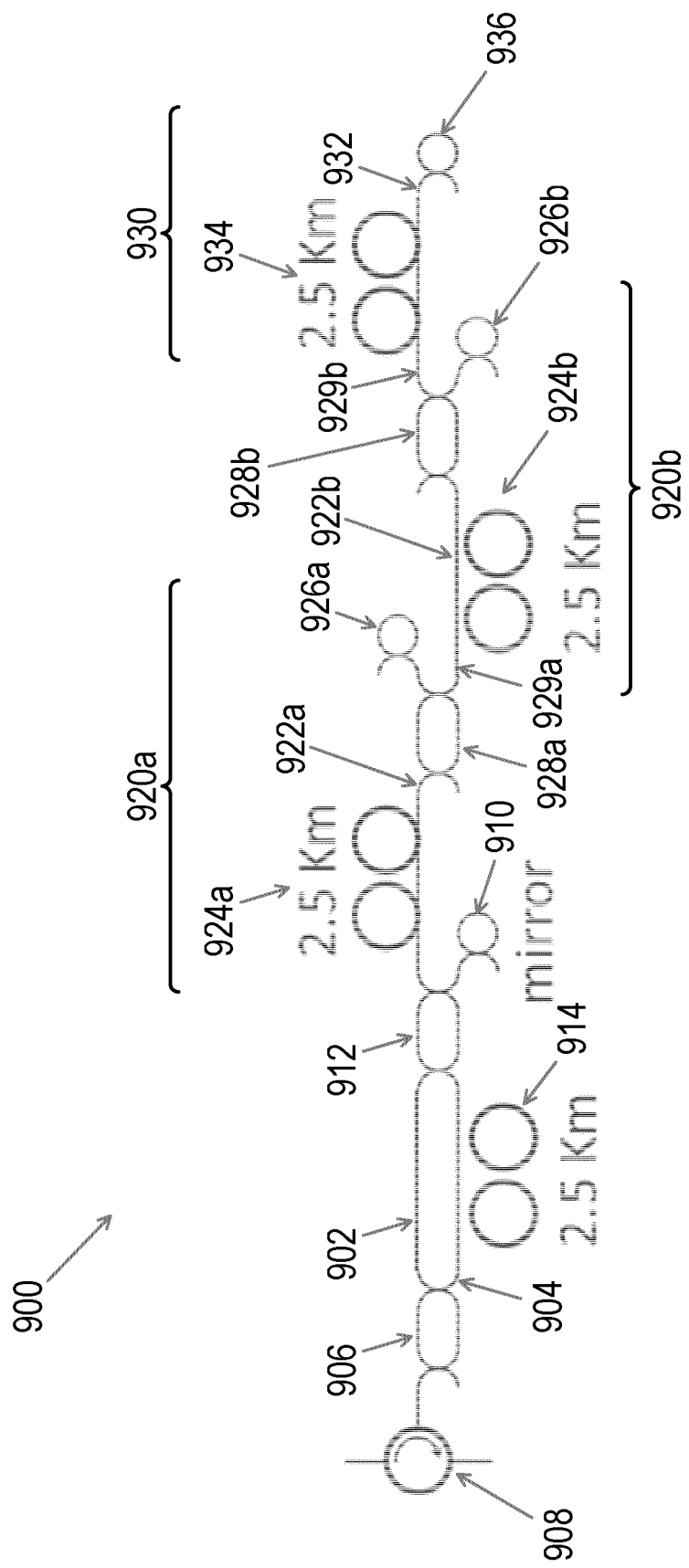
FIG. 9 illustrates an example implementation of an ODC.

FIG. 9 illustrates an example implementation of an ODC according to the schematic illustration of FIG. 8 but including two first extension modules 920a and 920b. The example ODC 900 of FIG. 9 comprises a first optical waveguide 902, second optical waveguide 904, first bidirectional switching element 906, input and output 908, first reflective element 910, second bidirectional switching element 912 and first ODC unit 914, all arranged according to the configuration described above with reference to FIG. 8. The ODC 900 further comprises a first extension module 920a including a first extension optical waveguide 922, first extension ODC unit 924 and first extension reflective element 922, all arranged according to the configuration described above with reference to FIG. 8. The ODC 900 also comprises another first extension module 920b connected in series with the first extension module 920a. The first extension module 920b includes a first extension optical waveguide 922, first extension ODC unit 924 and first extension reflective element 922, arranged according to the configuration described above with reference to FIG. 8 and connected to the output 929a of the first extension unit 920a. The ODC 900 further comprises a second extension unit 930 comprising a second extension optical waveguide 932, a second extension ODC unit 934 and a second extension reflective element 936, all arranged as described above with reference to ODC 800 and connected to the output 929b of the first extension unit 920b. In the illustrated example, each of the ODC units 914, 924a, 924b and 934 comprises two micro-ring resonators.

The ODC 900 may compensate for chromatic dispersion over a range of different transmission lengths, depending upon how many of the ODC units 914, 924a, 924b and 934 are activated. It will be appreciated that according to the configuration of the different switching elements, an optical signal may be directed through none, some or all of the ODC units.

Figure 10:
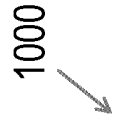
FIG. 10 is a table illustrating active elements in the ODC of FIG. 9.

The active switching elements and used ODC units are illustrated in table 1000 in FIG. 10, for an assumed ODC unit configuration that enables each ODC unit to compensate for chromatic dispersion over a transmission distance of 2.5 km at 50 Gbit/s for a maximum compensation distance of 20 km. FIG. 10 also illustrates the number of heating elements used for each compensation distance, which is equal to the number of active switches added to the number of active micro-ring resonators (two micro-ring resonators per ODC unit).

Referring to FIGS. 9 and 10 for a transmission distance of 0 km, no dispersion compensation is required, and all ODC units may therefore be bypassed. With all but the first bidirectional switching element 906 in the inactive state, an optical signal arriving at the input and output 908 of the ODC 900 is directed via the first optical waveguide 902 to the first reflective element 910 and returned via the first optical waveguide 902 to the input and output 908 without any additional imposed delay from the ODC units. In order to compensate for a transmission distance of 5 km, a single ODC unit should be traversed twice. By placing only switching element 912 in the active state, with all other switching elements in the inactive state, an optical signal arriving at the input and output 908 of the ODC 900 is directed via the second optical waveguide 904 and first ODC unit 914 to the first reflective element 910 and returned via the second optical waveguide 904 and first ODC unit 914 to the input and output 908. With each increase of 5 km in compensation distance, an additional ODC unit should be traversed twice. By activating only the bidirectional switching element immediately after the last ODC unit through which the optical signal should be directed, with all other bidirectional switching elements in the inactive state, compensation distances of 10, 15 or 20 km may be achieved, as indicated in the table 1000. A 20 km compensation distance may thus be achieved using the structure of ODC 900 with just 8 active micro-rings. A unidirectional structure with similar compensation capacity would require 16 micro-rings.

An ODC having the configuration of FIGS. 7, 8 and/or 9 thus minimises the number of active delay elements (such as micro-ring resonators) required to compensate for chromatic dispersion during transmission of an optical signal over varying transmission distances. Minimising the number of active delay elements minimises the electrical power requirements of the ODC, thus offering energy efficiency compared to prior known ODC configurations.

The bidirectional structure of ODCs 700, 800 and 900 also provides improvement in the number of rings and granularity of compensation distance compared to the structure of ODCs 200, 300 and/or 400 described above. For example the granularity of the ODC 900 is 5 km, compared to the 10 km granularity of ODC 400.

As discussed above, the precise number and nature of the delay elements in the ODC units, and the total number of ODC units, and hence the number of switching elements, may be adjusted according to the needs of a particular deployment. The number of delay elements required in each ODC unit will depend upon the optical signal bandwidth. This may be dictated by the signal bit rate, which will determine the optical signal bandwidth for a given modulation format. The number of ODC units to be included in the ODC will depend upon the total transmission distance to be compensated.

Figure 11:
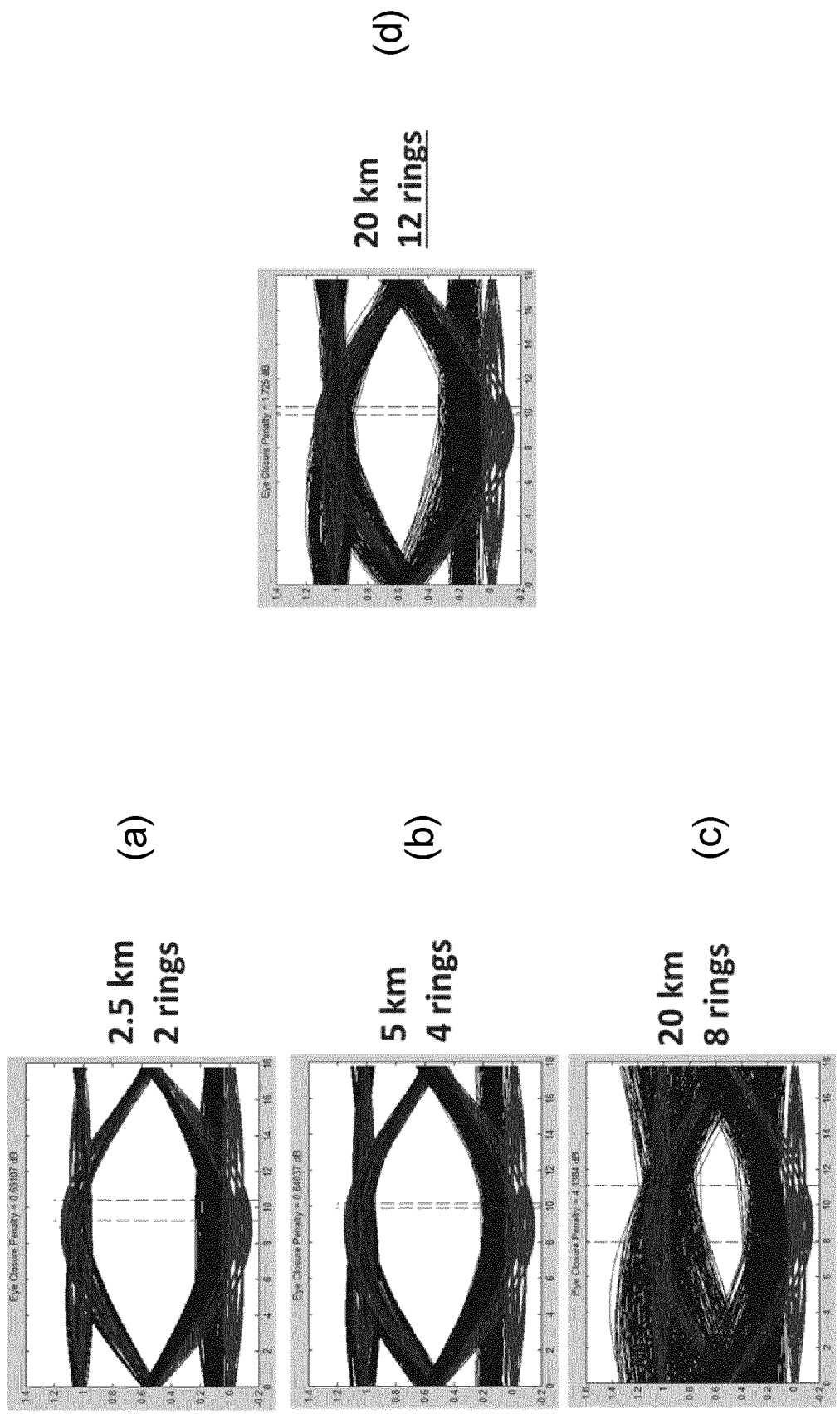
FIG. 11 illustrates eye diagrams for an optical signal emitted from a transmitter incorporating an ODC as illustrated in FIG. 9.

FIG. 11 illustrates eye diagrams for an optical signal emitted from a transmitter incorporating an ODC as illustrated in FIG. 9. Each eye diagram illustrates an optical signal having a bandwidth of 80 GHz after transmission over different transmission lengths. FIG. 11a illustrates the signal after 2.5 km using just 2 micro-rings. FIG. 11b illustrates the same signal after 5 km compensated distance using 4 micro-rings. FIG. 11c illustrates the same signal after 20 km compensated distance using 8 micro-rings. In can be seen from FIG. 11 that at 20 km compensated distance, the eye diagram is relatively closed. An improvement in the eye diagram can be achieved by increasing from 2 to 3 the number of micro-rings per ODC unit in the ODC 900. FIG. 11d illustrates an eye diagram for such a structure after 20 km compensated distance.

Figure 12:
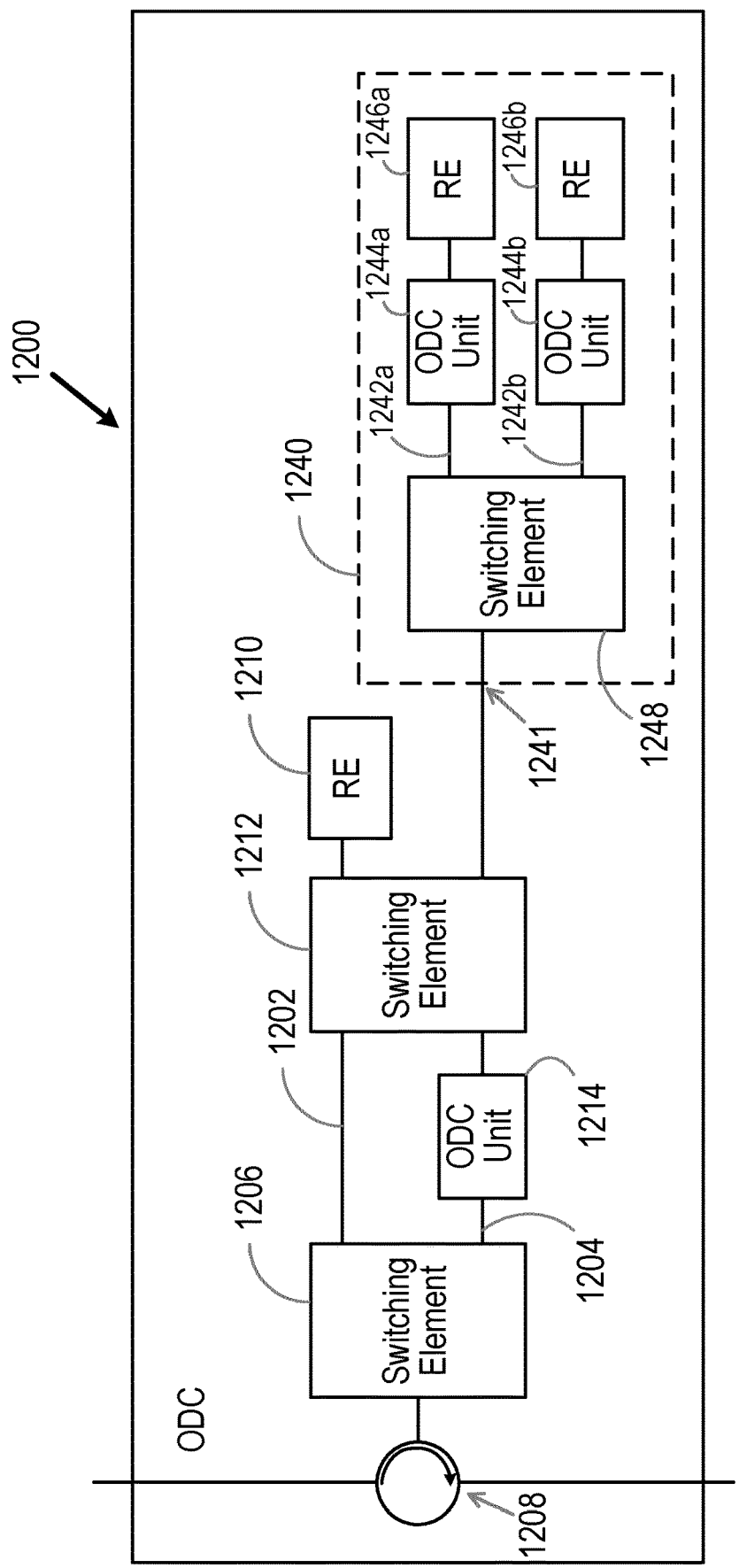
FIG. 12 is a schematic illustration of another example of ODC.

Additional improvements in energy efficiency for dispersion compensation may be achieved by an ODC architecture that seeks to minimise the overall number of heaters required, regardless of whether the heaters are required for activating a switching element or for tuning a delay element such as a micro-ring. An example of such a structure is illustrated in FIG. 12. The ODC 1200 of FIG. 12 comprises similar elements to those of ODC 700 of FIG. 7, with a different connectivity of the reflective element and additional elements, as discussed below.

FIG. 12 is a schematic illustration of an ODC 1200 according to another example of the present disclosure. The ODC 1200 is also for managing chromatic dispersion of an optical signal for transmission over an optical fiber. The ODC 1200 may be incorporated into a transmitter or a receiver and may be employed in a DWDM system. Referring to FIG. 12, the ODC 1200 comprises a first optical waveguide 1202, a second optical waveguide 1204 parallel to the first optical waveguide 1202 and a first bidirectional switching element 1206 interconnecting an input and output 1208 of the ODC 1200 with the first optical waveguide 1202 and the second optical waveguide 1204. The ODC 1200 further comprises a first reflective element such as a mirror 1210 operable to reflect an optical signal, a second bidirectional switching element 1212 interconnecting the first optical waveguide 1202 and the second optical waveguide 1204 with the first reflective element 1210, and a first ODC unit 1214. In contrast to the configuration of the ODC 700, the first ODC unit 1214 of the ODC 1200 is arranged on the second optical waveguide 1204 between the first and second switching elements 1206, 1212. As in configuration of the ODC 700, the first reflective element 1210 of the ODC 1200 is connected to an upper output of the second bidirectional switching element 1212, with the first optical waveguide 1202 connected to an upper input of the second bidirectional switching element 1212 and the second optical waveguide 1204 connected to a lower input of the second bidirectional switching element 1212.

In the ODC 1200, the first bidirectional switching element 1206 is configured, in a first state, to connect the input and output 1208 of the ODC to the second optical waveguide 1204 and, in a second state, to connect the input and output 1208 of the ODC to the first optical waveguide 1202. The second bidirectional switching element 1212 is configured, in a first state, to connect the second optical waveguide 1204 to the first reflective element 1210 and, in the second state, to connect the first optical waveguide 1202 to the first reflective element 1210. The first state may be an inactive state of the bidirectional switching elements, in which the switching elements do not consume electrical power, and the second state may be an active state in which the switching elements consume electrical power. The bidirectional switching elements may for example comprise 2:2 Mach Zehnder switches having a connectivity between upper and lower input and output ports in active and inactive states as described above with reference to FIG. 3.

The ODC 1200 further comprises a third extension module 1240 connected to an output of the second switching element 1212 such that the second switching element 1212 interconnects the first and second optical waveguides 1202, 1204 with the first reflective element 1210 and with an input 1241 of the third extension module 1240. The third extension module 1240 comprises a third extension first optical waveguide 1242a, a third extension first ODC unit 1244a arranged on the third extension first optical waveguide 1242a and a third extension first reflective element such as a mirror 1246a operable to reflect an optical signal and connected to the third extension first optical waveguide 1242a. The third extension module 1240 further comprises a third extension second optical waveguide 1242b, a third extension second ODC unit 1244b arranged on the third extension second optical waveguide 1242b and a third extension second reflective element such as a mirror 1246b operable to reflect an optical signal and connected to the third extension second optical waveguide 1242b. The third extension module 1240 further comprises a third extension bidirectional switching element 1248 interconnecting the input 1241 of the third extension module with the third extension first optical waveguide 1242a and the third extension second optical waveguide 1242b. In some examples the third extension first optical waveguide 1242a and third extension second optical waveguide 1242b may be in parallel, and may comprise third extension upper and lower waveguides respectively.

The third extension bidirectional switching element 1248 is configured, in a first state, to connect the input 1241 of the third extension module 1240 with the third extension second optical waveguide 1242b and, in a second state, to connect the input 1241 of the third extension module 1240 with the third extension first optical waveguide 1242a. The first state may be an inactive state of the bidirectional switching element, in which the switching element does not consume electrical power, and the second state may be an active state in which the switching element consumes electrical power. The third extension bidirectional switching element may comprise a 2:2 Mach Zehnder switch having a connectivity between upper and lower input and output ports in active and inactive states as described above with reference to FIG. 3. The input 1241 of the third extension module 1240 may thus be connected to an upper input port of the third extension module bidirectional switching element 1248, with the third extension first optical waveguide 1242a connected to an upper output port of the third extension module bidirectional switching element 1248 and the third extension second optical waveguide 1242b connected to a lower output port of the third extension module bidirectional switching element 1248.

Each of the third extension first and second ODC units 1244a, 1244b may comprise a plurality of delay elements such as micro-ring resonators, each delay element configured to apply a delay to a sub-band of the optical signal. As discussed in further detail below with reference to FIG. 13, each of the third extension first and second ODC units may comprise the same or a different number of delay elements.

The ODC 1200 provides dispersion compensation for varying transmission distances. With appropriate activation or non-activation of the bidirectional switching elements 1206, 1212 and 1248, an optical signal may bypass, or may be directed twice through none, one, two or all three of the ODC units 1214, 1244a and 1244b.

Figure 13:
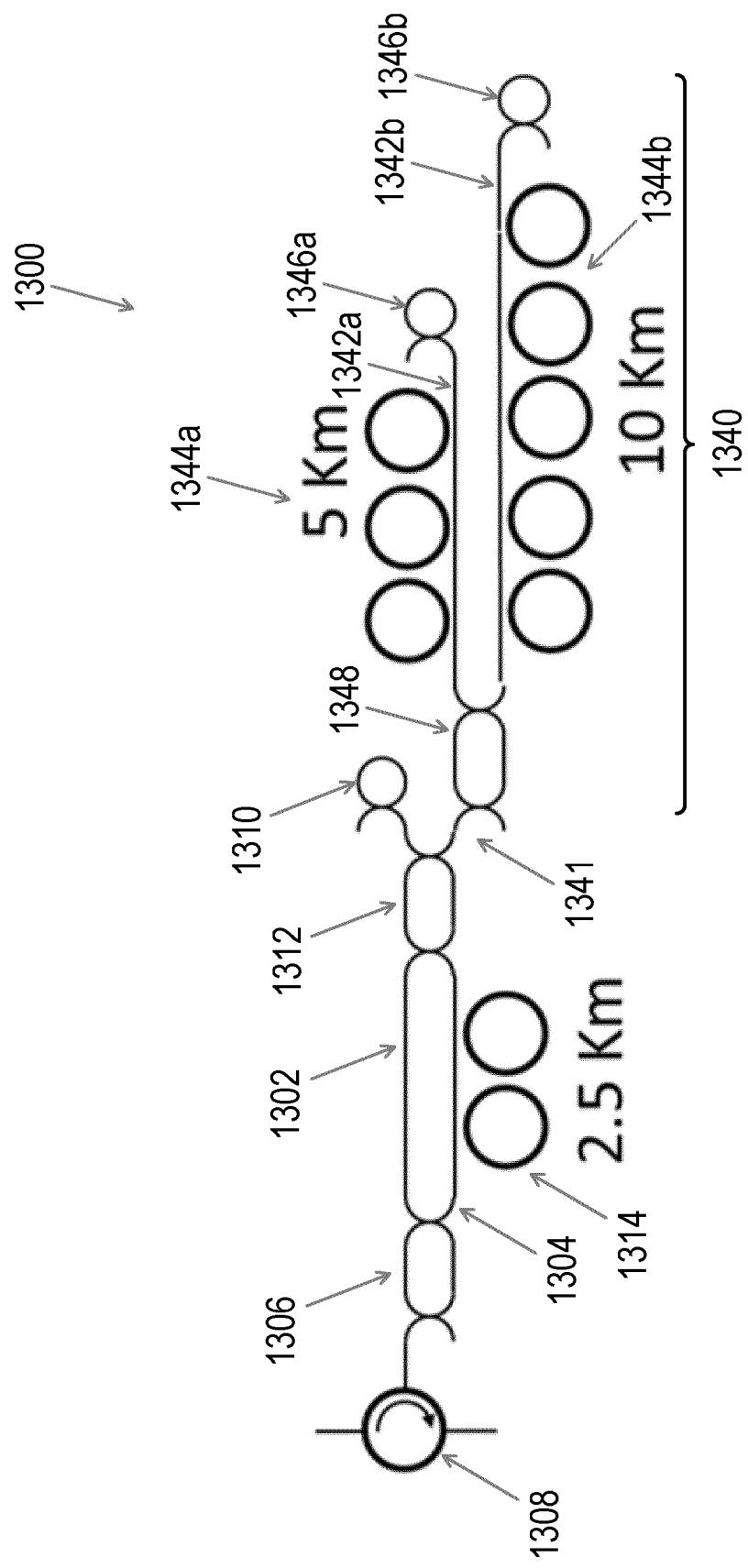
FIG. 13 illustrates an example implementation of an ODC.

FIG. 13 illustrates an example implementation of an ODC according to the schematic illustration of FIG. 12. The example ODC 1300 of FIG. 13 comprises a first optical waveguide 1302, second optical waveguide 1304, first bidirectional switching element 1306, input and output 1308, first reflective element 1310, second bidirectional switching element 1312 and first ODC unit 1314, all arranged according to the configuration described above with reference to FIG. 8. The ODC 900 further comprises a third extension module 1340 connected to an output of the second switching element 1312 as described above with reference to ODC 800. The third extension module 1340 comprises a third extension first optical waveguide 1342a, a third extension first ODC unit 1344a and a third extension first reflective element 1346a. The third extension module 1340 further comprises a third extension second optical waveguide 1342b, a third extension second ODC unit 1344b and a third extension second reflective element 1346b. The third extension module 1340 further comprises a third extension bidirectional switching element 1348 interconnecting an input 1341 of the third extension module with the third extension first optical waveguide 1342a and the third extension second optical waveguide 1342b. In some examples the third extension first optical waveguide 1342a and third extension second optical waveguide 1342b may be parallel, and may comprise third extension upper and lower waveguides respectively. The third extension bidirectional switching element 1348 is configured as described above with reference to ODC 800. The bidirectional switching elements of the ODC 1300 may be Mach Zehnder switches with connectivity on active and inactive states as described above with reference to FIG. 3.

Each ODC unit of the ODC 1300 comprises a different number of delay elements in the form of micro-ring resonators. The first ODC unit 1314 comprises 2 delay elements and is configured to compensate for a distance of 2.5 km, the third extension first ODC unit 1344a comprises 3 delay elements and is configured to compensate for a distance of 5 km and the third extension second ODC unit 1344b comprises 5 delay elements and is configured to compensate for a distance of 10 km.

The ODC 1300 may compensate for chromatic dispersion over a range of different transmission lengths, depending upon how many of the ODC units 1314, 1342a, 1342b are activated. It will be appreciated that according to the configuration of the different switching elements, an optical signal may be directed through none, some or all of the ODC units. The structure of ODC 1300 incorporates elements of both the ODC 700 and the ODC 200, with bidirectional propagation provided by reflective elements and ODC units arranged on separate parallel waveguides. The ODC 1300 thus incorporates aspects of the ODCs 200 and 700 to minimise the total number of heaters required for a given compensation distance, as illustrated in FIG. 14.

The active switching elements and used ODC units in ODC 1300 are illustrated in table 1400 of FIG. 14, an example of a 50 Gbit/s signal for a maximum compensation distance of 20 km is used. FIG. 14 also illustrates the number of heating elements used for each compensation distance, which is equal to the number of active switches added to the number of active micro-rings.

Referring to FIGS. 13 and 14 for a transmission distance of 0 km, no dispersion compensation is required, and all ODC units may therefore be bypassed. With the first and second bidirectional switching elements 1306, 1312 in the active state, an optical signal arriving at the input and output 1308 of the ODC 1300 is directed via the first optical waveguide 1302 to the first reflective element 1310 and returned via the first optical waveguide 1302 to the input and output 1308 without any additional imposed delay from the ODC units. In order to compensate for a transmission distance of 5 km, the first ODC unit 1314 should be traversed twice. With all switching elements in the inactive state, an optical signal arriving at the input and output 1308 of the ODC 1300 is directed via the second optical waveguide 1304 and first ODC unit 1314 to the first reflective element 1310 and returned via the second optical waveguide 1304 and first ODC unit 1314 to the input and output 1308. In order to compensate for a transmission distance of 10 km, the third extension module first ODC unit 1344a should be traversed twice. With only the first bidirectional switching element 1306 and the third extension module bidirectional switching element 1348 in the active state, an optical signal arriving at the input and output 1308 of the ODC 1300 is directed via the first optical waveguide 1304, second switching element 1312, third extension module bidirectional switching element 1348 and third extension module first ODC unit 1344*a* to the third extension module first reflective element 1346*a* and returned via these same elements to the input and output 1308. 15 and 20 km compensation distances may be achieved by directing an optical signal through an appropriate combination of ODC units as illustrated in table 14.

Comparison of Tables 1000 and 1400 shows that for compensation distances of 5 and 20 km, a saving of one heater is made using the ODC 1300 as opposed to the ODC 900, while a granularity of compensation distance of 5 km is maintained.

An ODC having the configuration of FIGS. 12 and/or 13 thus minimises the number of heaters required to compensate for chromatic dispersion during transmission of an optical signal over varying transmission distances. Minimising the number of heaters minimises the electrical power requirements of the ODC, thus offering energy efficiency compared to prior known ODC configurations.

As discussed above, the precise number and nature of the delay elements in the ODC units, and the total number of ODC units, and hence the number of switching elements, may be adjusted according to the needs of a particular deployment.

Figure 15:
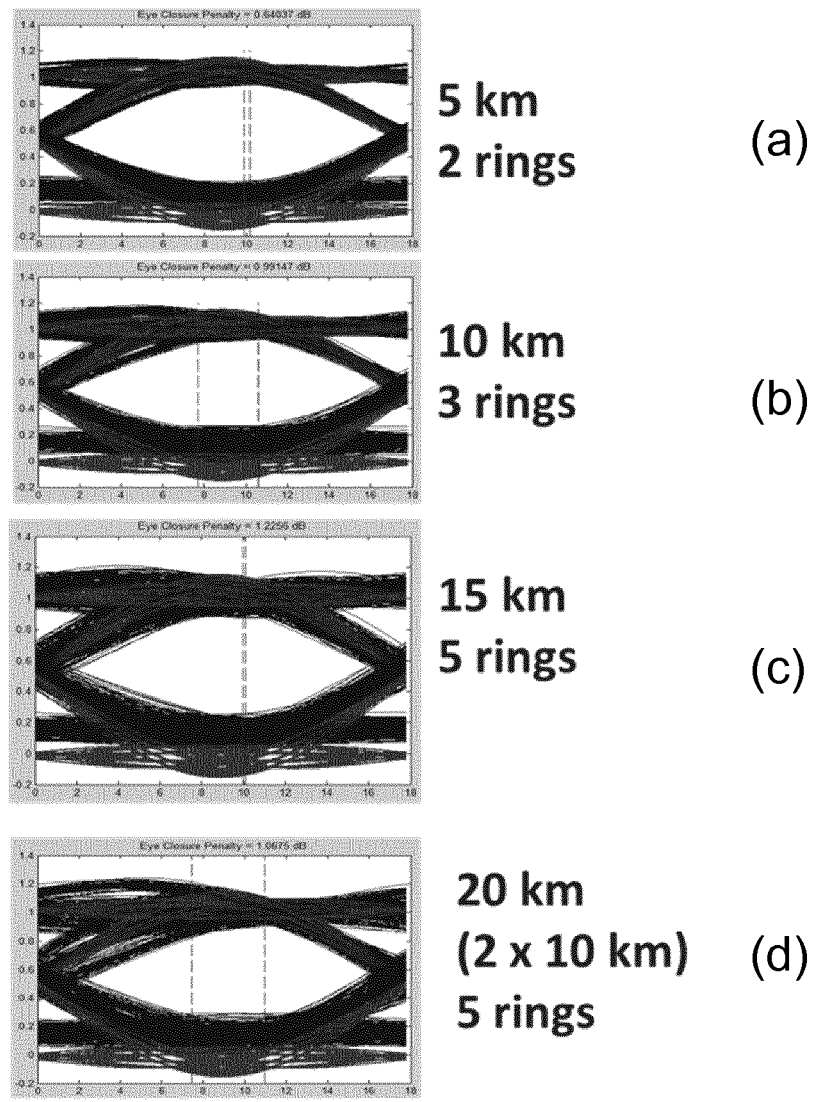
FIG. 15 illustrates eye diagrams for an optical signal emitted from a transmitter incorporating an ODC as illustrated in FIG. 13.

FIG. 15 illustrates eye diagrams for an optical signal emitted from a transmitter incorporating an ODC as illustrated in FIG. 13. Each eye diagram illustrates an optical signal having a bandwidth of 80 GHz after transmission over different transmission lengths. FIG. 15*a* illustrates the signal after 5 km using just 2 micro-rings. FIG. 15*b* illustrates the same signal after 10 km compensated distance using 3 micro-rings. FIG. 15*c* illustrates the same signal after 15 km compensated distance using 5 micro-rings and FIG. 15*d* illustrates the same signal after 20 km compensated distance using 5 micro-rings. A comparison of FIGS. 11 and 15 shows a considerable improvement in the compensated signal, with all of the eye diagrams being relatively open, even at 20 km and using only 5 micro-rings.

Figure 16:
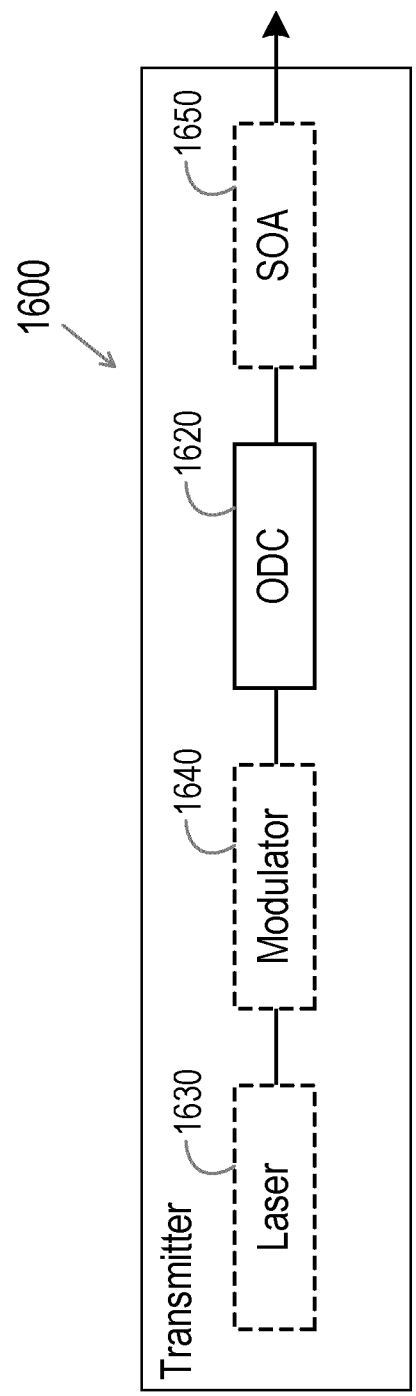
FIG. 16 is a schematic illustration of a transmitter.

As discussed above, examples of the ODC 200, 300, 400, 700, 800, 900, 1200 and/or 1300 may be incorporated into a transmitter or a receiver in an optical transmission system such as a DWDM system. If incorporated into a transmitter, the dispersion compensation may be considered as pre-compensation, since at the point of transmission the dispersion has not yet occurred. FIG. 16 illustrates a transmitter 1600 configured to transmit an optical signal, for example, over an optical communications network (not shown). The transmitter 1600 may be a part of a radio access network or metro network, and may be a part of a network node. The optical communications network may comprise one or more optical fibers, and the transmitter 1600 may transmit over an optical fiber.

In some examples, the transmitter 1600 may be a part of a transmitter of a 25 Gbit/s, 50 GBit/s or 100 Gbit/s optical transmission system. The transmitter 1600 comprises an ODC 1620 according to aspects of the present disclosure. The ODC 1620 may for example comprise an ODC 200, 300, 400, 700, 800, 900, 1200 and/or 1300 as described above. The transmitter 1600 may enable the cost effective implementation of high speed interfaces, for example using a receiver implementing direct detection. In some examples, the transmitter 1600 is used in a fronthaul network. For example, the transmitter may be a transmitter of a remote radio unit and/or a baseband processing unit.

The transmitter 1600 may comprise an optical light source 1630 such as a laser. In some examples, the laser emits light on a known linear polarization state, so avoiding the need for a dual polarization design or a polarization controller. The transmitter 1600 may further comprise a modulator 1640. The modulator 1640 may be configured to modulate light generated by the optical light source, or may be configured to directly control the optical light source to generate a modulated optical data signal, also referred to as an optical signal. The modulator 1640 receives data to be encoded in the optical data signal. In some examples, the modulator 1640 may be a Mach-Zehnder modulator.

As discussed above, the transmitter 1600 comprises an ODC 1620. The ODC 1620 is configured to compensate for dispersion which is expected to be introduced into the optical signal by an optical fiber or other transmission medium along which the optical signal is transmitted. The dispersion may be considered as an introduction of a time delay to the optical signal which is dependent on frequency. The time delay is a result of the velocity of the optical signal being dependent on the frequency in the dispersive transmission medium. The ODC is configured to compensate for the expected introduced time delay. It will be appreciated that as the ODC is incorporated in the transmitter 1600, the dispersion over the transmission medium has not yet occurred at the time the optical signal for transmission is directed through the ODC. The dispersion compensation provided by the ODC is therefore not a reaction to an introduced dispersion, but a proactive control of the optical signal prior to dispersion in the transmission medium.

The transmitter 1600 may also comprise a Semiconductor Optical Amplifier (SOA) 1650. The SOA 1650 may be used to compensate for power loss due to the ODC 1620 or to increase the transmitter power.

The transmitter 1600 may be, or form part of, a semiconductor photonics circuit, in which case the light source 1630, modulator 1640, ODC 1620 and SOA 1650 may be arranged on the same chip, which may be a hybrid chip. The transmitter 1600 may therefore comprise a single integrated photonics device or circuit. For example, the modulator 1640 and ODC 1620 may be realized in Silicon Nitride. The light source 1630 and SOA 1650, which function as gain blocks, may utilize a III-V material such as Indium Phosphide. The transmitter 1600 may therefore be a single polarization transmitter in which all the components are part of the same semiconductor photonics circuit or chip.

Figure 17:
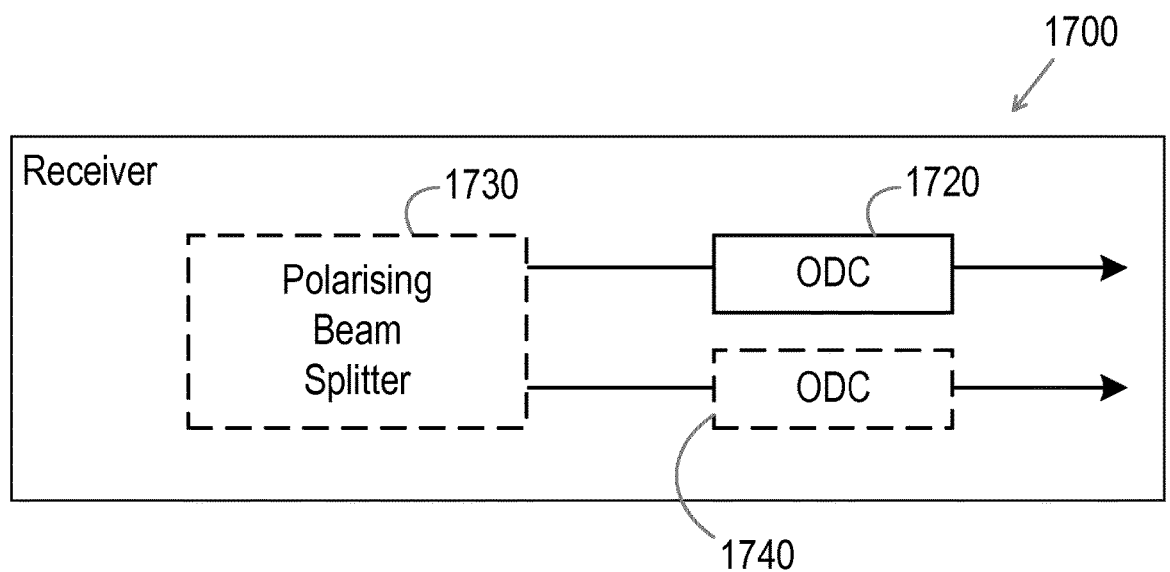
FIG. 17 is a schematic illustration of a receiver.

FIG. 17 illustrates another example of the present disclosure, in which an ODC is incorporated in a receiver. FIG. 17 shows a receiver 1700 configured to receive an optical signal, for example, over an optical communications network (not shown). The receiver 1700 may be a part of a radio access network or metro network, and may be a part of a network node. The optical communications network may comprise one or more optical fibers, and the receiver 1700 may receiver an optical signal over an optical fiber.

In some examples, the receiver 1700 may be a part of a receiver of a 25 Gbit/s, 50 GBit/s or 100 Gbit/s optical transmission system. The receiver 1700 comprises an ODC 1720 according to aspects of the present disclosure. The ODC 1720 may for example comprise an ODC 200, 300, 400, 700, 800, 900, 1200 and/or 1300 as described above. The receiver 1700 may enable the cost effective implementation of high speed interfaces, for example using direct detection. In some examples, the receiver 1700 is used in a fronthaul network. For example, the receiver may be a receiver of a remote radio unit and/or a baseband processing unit.

The receiver 1700 may comprise a polarising beam splitter 1730, which may split a received signal into two components having orthogonal polarisations. The ODC 1720 may be arranged on a first channel corresponding a first of the polarisations, and a second ODC 1740 may be arranged on a second channel corresponding to the second of the polarisations.

Aspects of the present disclosure also provide methods of transmitting and/or receiving a signal using a transmitter or receiver comprising an ODC according to any one of the aspects or examples described herein. According to examples of the present disclosure, the method of transmitting and/or receiving may comprise selectively activating one or more switching elements such that an optical signal is directed through an appropriate number of ODC units to provide a frequency dependent delay to the optical signal that compensates for chromatic dispersion experienced by or expected to be experienced by the signal during transmission. The amount of chromatic dispersion experienced or expected to be experienced during transmission over a given transmission length and transmission medium may be determined through experimentation and or using analytic or numerical methods. The method may further comprise selectively tuning appropriate ones of delay elements comprised within one or more ODC units of the ODC according to the amount of frequency dependent delay to be applied to the signal.

Figure 18:
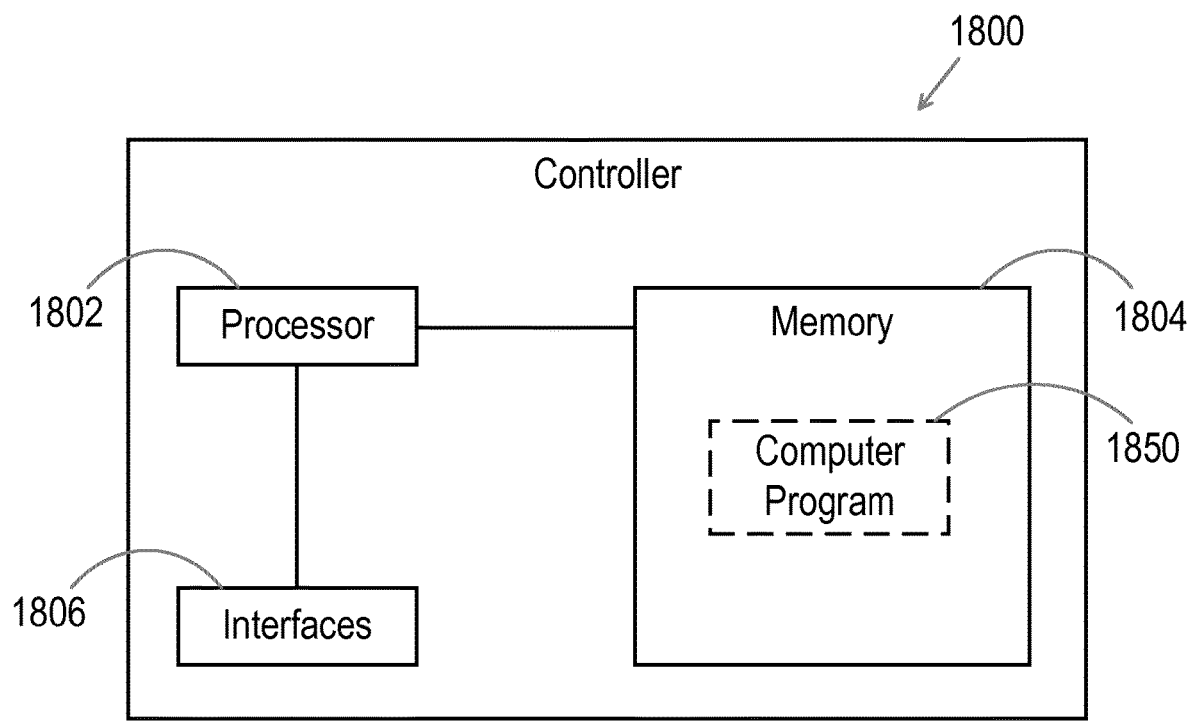
FIG. 18 is a schematic illustration of a controller.

FIG. 18 illustrates a controller 1800 which may manage the selective activation of switches and/or ODC units of an ODC according to any one of the aspects or examples described herein, for example under the direction of a computer program 1850. The controller comprise a processor 1802, a memory 1804 and may also comprise interfaces 1806. The memory 1804 contains instructions executable by the processor 1802 such that the controller 1800 is operative to conduct some or all of the method steps discussed above. The instructions may be stored in the form of computer program 1850. The processor 1802 may be implemented by any type of integrated circuit, e.g. ASIC or FPGA etc. The memory may be any suitable memory for the processor, e.g. RAM, ROM, solid state disk, hard disk drive etc.

Aspects of the present disclosure thus provide a modular optical device for compensating the chromatic dispersion of an optical fiber link. The optical device comprise one or more ODC units, each comprising one or more delay elements such as micro-ring resonators and operable to compensate a fixed amount of chromatic dispersion. In some examples, an ODC may comprise a sequence of ODC units, each unit following a switch in the direction of propagation of the ODC. The ODC units may be placed alternately on first and second, or upper and lower optical buses connecting successive switches. According to such a configuration, any number of ODC units may be used or bypassed by activating only a single switch, so minimising the heating requirements of the switching elements. According to other examples, reflective elements may be introduced to provide bidirectional propagation and so minimise the number of delay elements. In some aspects, an example of bypassing an ODC unit may be used in the same ODC as a reflective element. The reflective elements may be introduced into an alternating structure such as that described above, as illustrated for example in FIG. 9. According to still further examples, aspects of the above discussed configurations may be combined to minimise a number of heaters required both for activating swathes and for tuning delay elements. Examples of ODCs according to the present disclosure may be incorporated in a transmitter or in a receiver of an optical system such as a DWDM system.

Examples of the present disclosure thus provide a highly energy efficient solution for compensation of chromatic dispersion in a DWDM high-speed transmission link based on direct detection optical interfaces by. This is achieved through minimising the number of active switching element, or the number of employed delay elements, or the number of heaters used either for switch activation or for delay element tuning. The potential for realisation in integrated photonics also afford energy savings compared to less energy efficient electrical technology. Examples of the present disclosure can be embedded in the transmitter or receiver of a pluggable module and so require no additional external device. In addition, examples of the present disclosure are easily configurable and are wavelength port agnostic, meaning that one device will be suitable for all channels.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An Optical Dispersion Compensator, ODC, for managing chromatic dispersion of an optical signal for transmission over an optical fiber; the ODC comprising:
   a first ODC unit arranged on a first optical bus;
   a second ODC unit arranged on a second optical bus, wherein the second optical bus is in parallel to the first optical bus; and
   a switching element interconnecting the first and second optical buses, wherein the switching element is located between the first and second ODC units in a direction of propagation of the ODC;
   wherein the first and second ODC units are operable to provide a delay to the optical signal that varies with frequency; and
   wherein the switching element is configured, in a first state, to switch an optical signal received on one of the first or second optical buses to the other of the first or second optical buses and, in a second state, to maintain an optical signal received on one of the first or second optical buses on the optical bus on which it was received;
   further comprising:
   a plurality of ODC units alternately arranged on the first and second optical buses such that in a direction of propagation of the ODC, an ODC unit on one of the first or second optical buses is followed by an ODC unit on the other of the first and second optical buses; and a plurality of switching elements interconnecting the first and second optical buses between the ODC units, and wherein only one of the switching elements is in an active state to compensate for different amounts of optical dispersion.

2. An ODC as claimed in claim 1, wherein at least one optical switching unit interconnects the first and second optical buses immediately before or immediately after each ODC unit.

3. An ODC as claimed in claim 1, further comprising:
an input switching element interconnecting an input of the ODC with the first and second optical buses, wherein the input switching element is configured, in a first state, to transfer an optical signal received from the input of the ODC to one of the first or second optical buses and, in a second state, to transfer an optical signal received from the input of the ODC to the other of the first or second optical buses.

4. A transmitter comprising an ODC as claimed in claim 1.

5. A receiver comprising an ODC as claimed in claim 1.

6. A method for transmitting an optical signal from a transmitter comprising an ODC as claimed in claim 1, the method comprising:
selectively activating the switching element such that the optical signal is either transmitted through the second ODC unit or bypasses the second ODC unit.

* * * * *